(12) United States Patent
Tarighat Mehrabani et al.

(10) Patent No.: US 9,860,760 B2
(45) Date of Patent: Jan. 2, 2018

(54) SCALABLE RADIO FREQUENCY COMMUNICATION SYSTEM

(71) Applicant: BROADCOM CORPORATION, Irvine, CA (US)

(72) Inventors: Alireza Tarighat Mehrabani, Irvine, CA (US); Michael Boers, Turramurra (AU); Masoud Kahrizi, Irvine, CA (US); Tirdad Sowlati, Irvine, CA (US); Bagher Afshar, Irvine, CA (US); Payam Torab Jahromi, Laguna Niguel, CA (US); Sean Timothy Nicolson, Irvine, CA (US); Brima Babatunde Ibrahim, Laguna Hills, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 114 days.

(21) Appl. No.: 14/952,871

(22) Filed: Nov. 25, 2015

(65) Prior Publication Data

US 2016/0150542 A1 May 26, 2016

Related U.S. Application Data

(60) Provisional application No. 62/085,011, filed on Nov. 26, 2014, provisional application No. 62/152,759, (Continued)

(51) Int. Cl.
*H04L 27/18* (2006.01)
*H04W 16/28* (2009.01)
*H04W 88/08* (2009.01)

(52) U.S. Cl.
CPC .......... *H04W 16/28* (2013.01); *H04W 88/085* (2013.01)

(58) Field of Classification Search
CPC .. H04W 16/28; H04W 76/046; H04B 7/0408; H04B 7/0617
See application file for complete search history.

(56) References Cited

U.S. PATENT DOCUMENTS 6,633,190 B1    10/2003  Alvandpour et al.
7,974,596 B2 *   7/2011  Lim ...................... H04W 52/52
                                                                455/126

(Continued)

OTHER PUBLICATIONS

"Small Cell Millimeter Wave Mesh Backhaul—the first step for Millimeter Wave Hotspot deployments", InterDigital Whitepaper, Feb. 2013, 24 pgs.

(Continued)

*Primary Examiner* — Bobbak Safaipour
(74) *Attorney, Agent, or Firm* — McDermott Will & Emery LLP

(57) ABSTRACT

A device implementing the subject scalable radio frequency communication system includes one or more primary radio frequency integrated circuits (RFICs) and at least one secondary RFIC. Each of the one or more primary RFICs is configured to receive an intermediate frequency (IF) signal from a baseband processor, upconvert the IF signal to a radio frequency (RF) signal, and transmit the RF signal to one or more secondary RFICs. The secondary RFICs under each of the one or more primary RFICs are configured to receive the RF signal from the corresponding primary RFIC, phase shift and amplify the RF signal, and transmit the RF signal via a plurality of antenna elements.

22 Claims, 15 Drawing Sheets

Related U.S. Application Data filed on Apr. 24, 2015, provisional application No. 62/188,405, filed on Jul. 2, 2015.

(56) References Cited

U.S. PATENT DOCUMENTS

| | | | |
|---|---|---|---|
| 8,553,821 B1* | 10/2013 | Eliaz | H04L 25/03178 375/148 |
| 2011/0069605 A1* | 3/2011 | Laudel | H04L 25/03019 370/210 |
| 2012/0028690 A1* | 2/2012 | Liu | H01Q 1/246 455/571 |
| 2012/0328036 A1 | 12/2012 | Chang | |
| 2014/0022125 A1 | 1/2014 | Zhu et al. | |
| 2014/0204902 A1 | 7/2014 | Maltsev et al. | |
| 2014/0206368 A1 | 7/2014 | Maltsev et al. | |
| 2014/0308892 A1 | 10/2014 | Lee | |
| 2016/0134412 A1 | 5/2016 | Zimmerman | |
| 2016/0150591 A1* | 5/2016 | Tarighat Mehrabani | H04W 76/046 370/329 |
| 2016/0156490 A1* | 6/2016 | Tarighat Mehrabani | H04W 76/046 455/23 |
| 2016/0308563 A1* | 10/2016 | Ouyang | H04B 1/1081 |

OTHER PUBLICATIONS

Hur, et al., "Millimeter Wave Beamforming for Wireless Backhaul and Access in Small Cell Networks", IEEE Transactions on Communications, vol. 61, No. 10, Oct. 2013, pp. 4391-4403.

* cited by examiner

SCALABLE RADIO FREQUENCY COMMUNICATION SYSTEM

CROSS-REFERENCE TO RELATED APPLICATIONS

The present application claims the benefit of U.S. Provisional Patent Application Ser. No. 62/085,011, entitled "Scalable and Modular RF Solution for High Performance mmWave Communications," filed on Nov. 26, 2014, U.S. Provisional Patent Application Ser. No. 62/152,759, entitled "Scalable and Modular RF Solution for High Performance mmWave Communications," filed on Apr. 24, 2015, and U.S. Provisional Patent Application Ser. No. 62/188,405, entitled "Scalable and Modular RF Architectures," filed on Jul. 2, 2015, all of which are hereby incorporated by reference in their entireties for all purposes.

TECHNICAL FIELD

The present description relates generally to a communication system, including a scalable radio frequency communication system.

BACKGROUND

Millimeter wavelength (mmWave) applications in consumer electronics typically benefit from lower power and cost in exchange for lower performance (e.g., shorter range). On the other end of the spectrum, backhaul mmWave applications may have high performance requirements in terms of range and coverage but can tolerate higher power consumption and cost. For example, backhaul mmWave applications may require a large number of antenna elements, such as 50 or more antenna elements.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
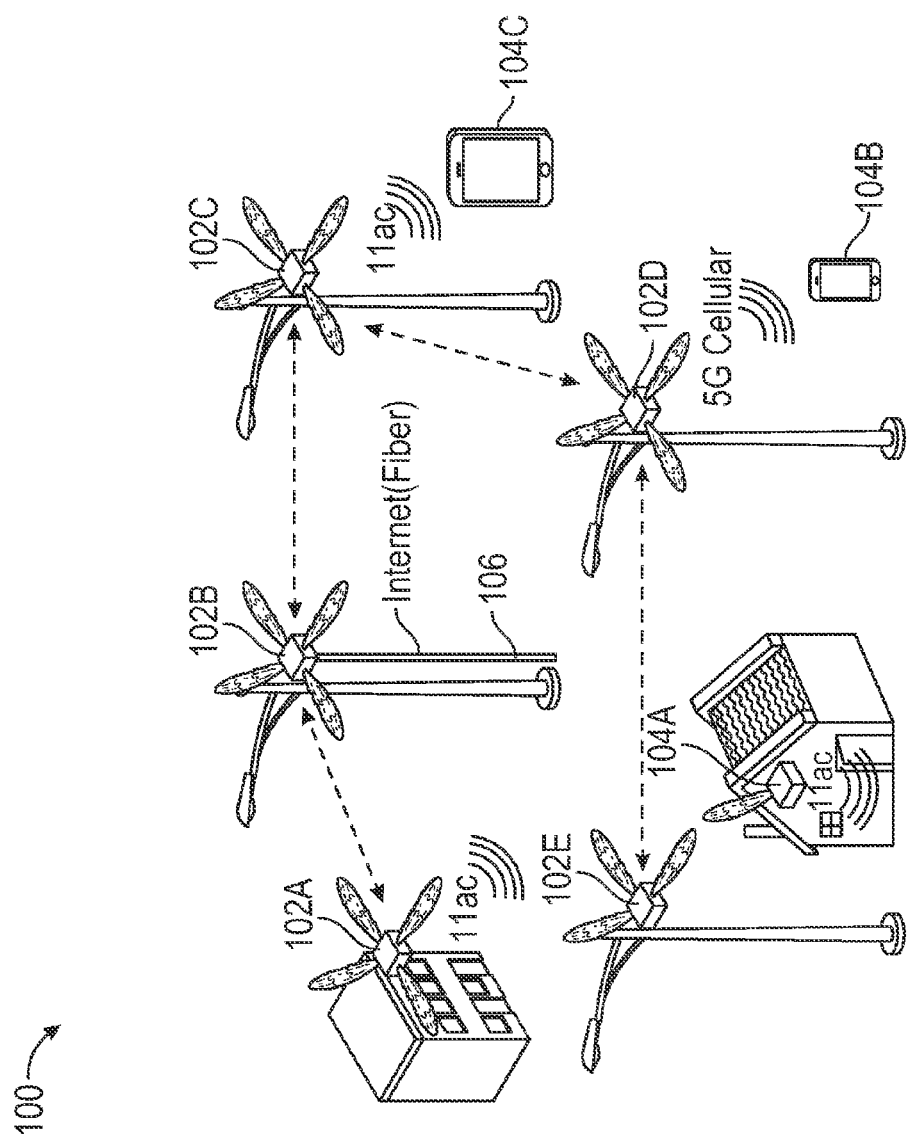
FIG. 1 illustrates an example network environment in which a scalable radio frequency communication system may be implemented in accordance with one or more implementations.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject scalable radio frequency (RF) communication system includes a modular RFIC die design that can be applied to both consumer electronic and backhaul applications. The resulting RFIC can be configured to operate in a first mode for single RFIC implementations, such as consumer electronic applications, and a second mode for multi-RFIC implementations, such as backhaul applications. With respect to multi-RFIC implementations, one or more primary RFICs and multiple secondary RFICs may be arranged in a cascaded (or tiled) fashion with each of the secondary RFICs including a given number of antenna elements. The primary RFIC receives an intermediate frequency (IF) signal from the baseband processor, upconverts the IF signal to an RF signal, performs phase shifting on the RF signal, and transmits the RF signal to each of the secondary RFICs for transmission via the antenna elements. The secondary RFICs receive the RF signal from the primary RFIC, phase shift the RF signal, e.g. to implement beamforming, and transmit the RF signal via the antenna elements. Beamforming can be used in the subject system, for example, to generate combined beams (with higher transmit and receive gain), and/or to generate distinct beam patterns covering multiple directions at the same time.

Thus, the subject scalable RF communication system includes a modular RFIC die design that can address different markets and needs in an incremental fashion by reusing the same silicon dies. The subject system may also utilize one or more levels of intermediate RFICs, e.g. in a hierarchical or cascaded fashion, to scale to an even greater number of secondary RFICs and consequently a greater number of antenna elements. The subject system may improve time-to-market, development cost, production cost, and addressable market sectors. One application of the subject system may include mmWave communications, including Institute of Electrical and Electronics Engineers (IEEE) 802.11ad, IEEE 802.11aj, IEEE 802.11ay, IEEE 802.15.3c and related standards such as Wi-Fi/WiGig Serial Bus, Wi-Fi/WiGig SD Extension, WiGig Bus Extension and WiGig Display Extension (all making use of 802.11ad/aj/ay PHY), Wireless HD (making use of 802.15.3c PHY). The description below uses mmWave as an example, but the subject system is widely applicable in other communication environments.

FIG. 1 illustrates an example network environment 100 in which a scalable radio frequency communication system may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 100 includes one or more base station devices 102A-E and one or more user devices 104A-C. One or more of the base station devices 102A-E, such as the base station device 102B, may be coupled to a network, such as the Internet, via a transmission media 106, such as a fiber optic transmission media. In one or more implementations, the transmission media 106 may be shared by tens, hundreds, thousands, or any number of base station devices 102A-E and/or nodes. The base station devices 102A-E utilize one or more wireless communication technologies, such as mmWave technologies, to communicate with another, e.g. via backhaul communications. For example, the base station devices 102A,C-E may utilize backhaul communications to access/share the network connection of the base station device 102B, e.g. via the transmission media 106. The base station devices 102A-E may be arranged in a star topology, a ring topology, a mesh topology, or generally any network topology through which backhaul communications may be implemented.

The base station devices 102A-E also communicate with one or more of the user devices 104A-C using one or more wireless communication technologies, such as Wi-Fi (802.11ac, 802.11ad, etc.), cellular (3G, 4G, 5G, etc.). For example, the base station devices 102A,C may communicate with one or more of the user devices 104A-C using 802.1ac communications, while the base station device 102D may communication with one or more of the user devices 104A-C using 5G cellular communications. In one or more implementations, the base station devices 102A-E may have a small form factor, such as five inches by five inches by five inches (height by width by depth), and may be mounted, for example, on telephone poles and/or other municipal infrastructure. Thus, the base station devices 102A-E may be used to provide low-cost municipal Wi-Fi, e.g. nodes utilizing 802.11ac technology and/or communicating over unlicensed bands, for providing 4G/5G small cell backhauling, and/or for providing broadband and fiber to homes and/or dwelling units, e.g. to cover the last mile through multiple hops to provide, e.g. gigabit speeds to homes and/or dwelling units.

In order to provide high throughput backhaul communications, e.g. using mmWave communications, the base station devices 102A-E may include a large number of antenna elements, such as tens, hundreds, thousands, or any number of antenna elements, to implement directional beamforming. Thus, the base station devices 102A-E may implement the subject scalable RF communication system using multiple RFICs, e.g. as is discussed below with respect to FIGS. 2 and 8. Since the user devices 104A-C may not provide high throughput backhaul communications, the user devices 104A-C may utilize a lesser number of antenna elements than the base station devices 102A-E. Thus, the user devices 104A-C may implement the subject scalable RF communication system using a single RFIC, e.g. as is discussed further below with respect to FIG. 3.

Although the base station devices 102A-E may utilize multiple RFICs and the user devices 104A-C may utilize a single RFIC, in one or more implementations, each of the RFICs of the base station devices 102A-E and/or the user devices 104A-C may be based on a single modular RFIC that can be configured to operate in either a single RFIC implementation, or a multiple RFIC implementation. A modular RFIC is discussed further below with respect to FIGS. 3 and 4.

In one or more implementations, the RFICs may be multi-stream RFICs that can simultaneously transport two separate waveforms per RFIC. Each of the multi-stream RFICs may transport multiple waveforms at the same RF frequency, such as through one or more multiple input multiple output (MIMO) modes including single user-MIMO (SU-MIMO), multi-user MIMO (MU-MIMO), etc., and/or each of the RFICs may transport multiple waveforms at different RF frequencies, such as to perform carrier aggregation, frequency division multiple access (FDMA), etc. Example multi-stream RFICs supporting multiple simultaneous waveforms are discussed further below with respect to FIGS. 12-14.

Figure 2:
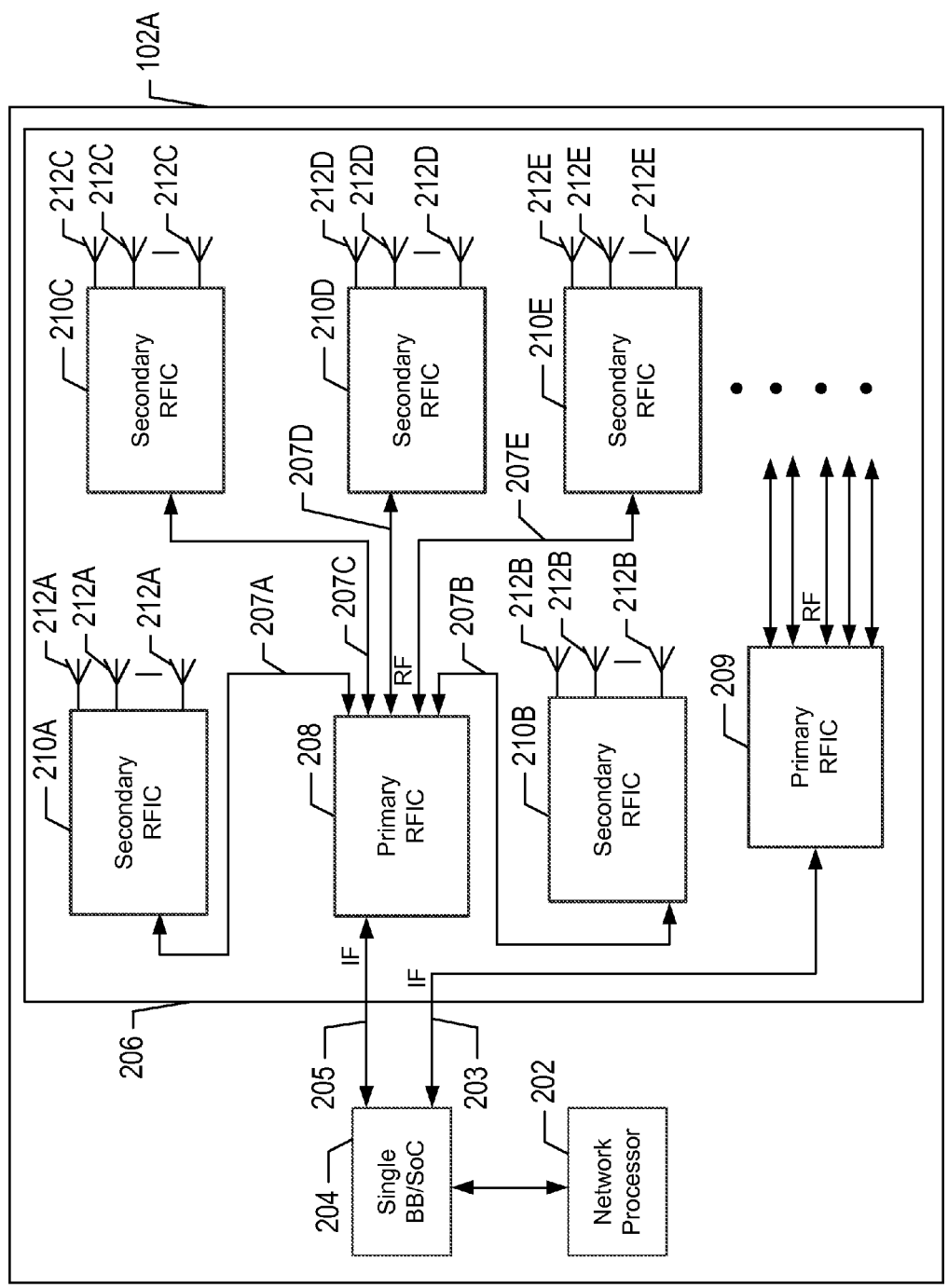
FIG. 2 illustrates an example base station device implementing a scalable radio frequency communication system in accordance with one or more implementations.

FIG. 2 illustrates an example base station device 102A implementing a scalable radio frequency communication system 206 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example base station device 102A includes a network processor 202, a single baseband processor 204, and the scalable RF communication system 206. The single baseband processor 204 may be, may include, and/or may be part of a system on a chip (SoC). The scalable RF communication system 206 includes one or more primary RFICs 208, 209 and a number of secondary RFICs 210A-E. Each of the secondary RFICs 210A-E includes a number of antenna elements 212A-E. In one or more implementations, the one or more primary RFICs 208, 209 may each be referred to as a "master" RFIC and the secondary RFICs 210A-E may be referred to as "slave" RFICs.

For explanatory purposes, the scalable RF communication system 206 is illustrated as including five secondary RFICs 210A-E directly coupled to the primary RFIC 208. However, the scalable RF communication system 206 may include any number of secondary RFICs 210A-E directly coupled to the primary RFIC 208, and any number of secondary RFICs (not shown) coupled to the primary RFIC 209. For example, the scalable RF communication system 206 may include any number of secondary RFICs 210A-E, such as, for example, ten secondary RFICs 210A-E, each of which may include any number of antenna elements 212A-E, such as, for example, twelve antenna elements 212A-E. In this instance, the scalable RF communication system 206 may include hundreds of antenna elements 212A-E, such as, for example, one hundred and twenty elements 212A-E, that are combined with the single baseband processor 204 to provide several Gigabits per second (Gbps), for example, 4.6 Gigabits per second (Gbps), at a few hundred meters range, such as, for example, at approximately 300 meters range, and with a full link power consumption of a few watts, such as, for example, approximately 3.9 watts. In one or more implementations, one or more of the secondary RFICs 210A-E may be used for redundancy and/or yield.

The baseband processor 204 is coupled to the primary RFIC 208 via a transmission media 205 and to the primary RFIC 209 via a transmission media 203. The transmission media 203, 205 may be, for example, coaxial transmission media, or generally any transmission media that can carry an intermediate frequency (IF) signal. In one or more implementations, the baseband processor 204 is directly coupled to exclusively each of the primary RFICs 208, 209 via the transmission media 203, 205, e.g. the baseband processor 204 is not directly coupled to any of the secondary RFICs 210A-E of the primary RFIC 208 or any of the secondary RFICs (not shown) of the primary RFIC 209. The primary RFIC 208 is coupled to each of the secondary RFICs 210A-E via transmission media 207A-E. The transmission media 207A-E may be, for example, a waveguide, or generally any transmission media that can carry an RF signal.

The baseband processor 204 may communicate control information for one or more of the primary RFICs 208, 209 and/or the secondary RFICs 210A-E via the transmission media 205 to the primary RFIC 208 and the transmission media 203 to the primary RFIC 209. The control information may include, for example, phase shifting information, gain information, power control information, or generally any control information that may be relevant to one or more of the RFICs 208, 209, 210A-E. For example, the baseband processor 204 may determine a subset of the secondary RFICs 210A-E to use for any given communication, e.g. based on link budget needs, such as range, performance, etc. The baseband processor 204 may then transmit, to the primary RFIC 208, power control information that corresponds to each of the secondary RFICs 210A-E. The primary RFIC 208 relays the power control information to the appropriate secondary RFICs 210A-E. The power control information may indicate whether each of the RFICs 210A-E, and/or a portion or all of the antenna elements 212A-E of each of the RFICs 210A-E, should be powered on or off for any given communication, and/or may indicate specific transmission power levels corresponding to each of the secondary RFICs 210A-E.

The control information transmitted by the baseband processor 204 may be individually addressed to one primary RFIC 208, 209 or secondary RFIC 210A-E, or may address an arbitrary group of primary RFICs 208, 209 and/or secondary RFIC 210A-E, such as by including pages and/or identifiers corresponding to each of the RFICs 208, 209, 210A-E. The primary RFIC 208 may be coupled to one or more of the secondary RFICs 210A-E via one or more out-of-band control channels, and the primary RFIC 209 may be coupled to one or more secondary RFICs (not shown) via one or more out-of-band control channels. When the primary RFIC 208 receives control information addressed to one or more of the secondary RFICs 210A-E, the primary RFIC 208 transmits the control information to the appropriate secondary RFICs 210A-E, e.g. via the out-of-band control channels as is discussed further below with respect to FIGS. 3-6. The primary RFIC 209 similarly forwards control information to its secondary RFICs (not shown) via its out-of-band control channels.

Thus, in the transmit direction, the primary RFIC 208 receives an IF signal from the baseband processor 204 via the transmission media 205, upconverts the IF signal to an RF signal, phase shifts the RF signal and then transmits the RF signal to each of the secondary RFICs 210A-E via the transmission media 207A-E. The secondary RFICs 210A-E receive the RF signal from the primary RFIC 208, phase shift the RF signal (e.g. in unison to effectuate directional beamforming) and transmit the RF signal via the antenna elements 212A-E. The phase shifters in each of the secondary RFICs 210A-E may be switched in a synchronized manner to ensure proper functioning of beam refinement algorithms, e.g. by avoiding undesired transient variation patterns. For example, each of the secondary RFICs 210A-E may include a synchronized timer that is used to switch the phase shifters of each of the secondary RFICs 210A-E in a synchronized manner. The primary RFIC 209 may receive a separate IF signal from the baseband processor 204 and process the IF signal similarly as the primary RFIC 208, but with respect to its own secondary RFICs (not shown). An example transmit process of the subject system is discussed further below with respect to FIG. 7.

In the receive direction, the secondary RFICs 210A-E receive an RF signal via the antenna elements 212A-E, phase shift the received signal and transmit the received RF signal to the primary RFIC 208 via the transmission media 207A-E. The primary RFIC 208 phase shifts and combines the received RF signals, downconverts the RF signals to IF, and transmits the IF signal to the baseband processor 204 via the transmission media 205. Thus, while the primary RFIC 208 includes mixers for upconverting/downconverting, the secondary RFICs 208A-E may not include any mixers and/or may not include any active or powered mixers. The primary RFIC 209 may similarly receive and process a separate RF signal from its secondary RFICs (not shown).

An example primary RFIC 208 is discussed further below with respect to FIG. 5 and an example secondary RFIC 210A is discussed further below with respect to FIG. 6. Furthermore, a modular RFIC that can be configured to operate as either a primary RFIC 208 or a secondary RFIC 210A is discussed further below with respect to FIGS. 3-4. Lastly, example layouts and substrates, e.g. printed circuit board (PCB) layouts, of the subject scalable radio frequency communication system are discussed further below with respect to FIGS. 9-11.

For explanatory purposes, the scalable radio frequency communication system 206 of FIG. 2 is illustrated as having one tier, or one level, of separation between the primary RFIC 208 and the secondary RFICs 210A-E. However, the scalable radio frequency communication system 206 may include multiple levels and/or tiers, e.g. in a cascaded or hierarchical fashion, between the primary RFIC 208 and the secondary RFICs 210A-E. Thus, the scalable radio frequency communication system 206 may include one or more levels or tiers of intermediate RFICs between the primary RFIC 208 and the secondary RFICs 210A-E. In this manner, the scalable radio frequency communication system 206 can fan out/scale to an even greater number of antenna elements 212A-E without altering the design of the RFICs 208, 210A-E.

In one or more implementations, one or more of the network processor 202, the baseband processor 204, the primary RFICs 208, 209, one or more of the secondary RFICs 210A-E, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
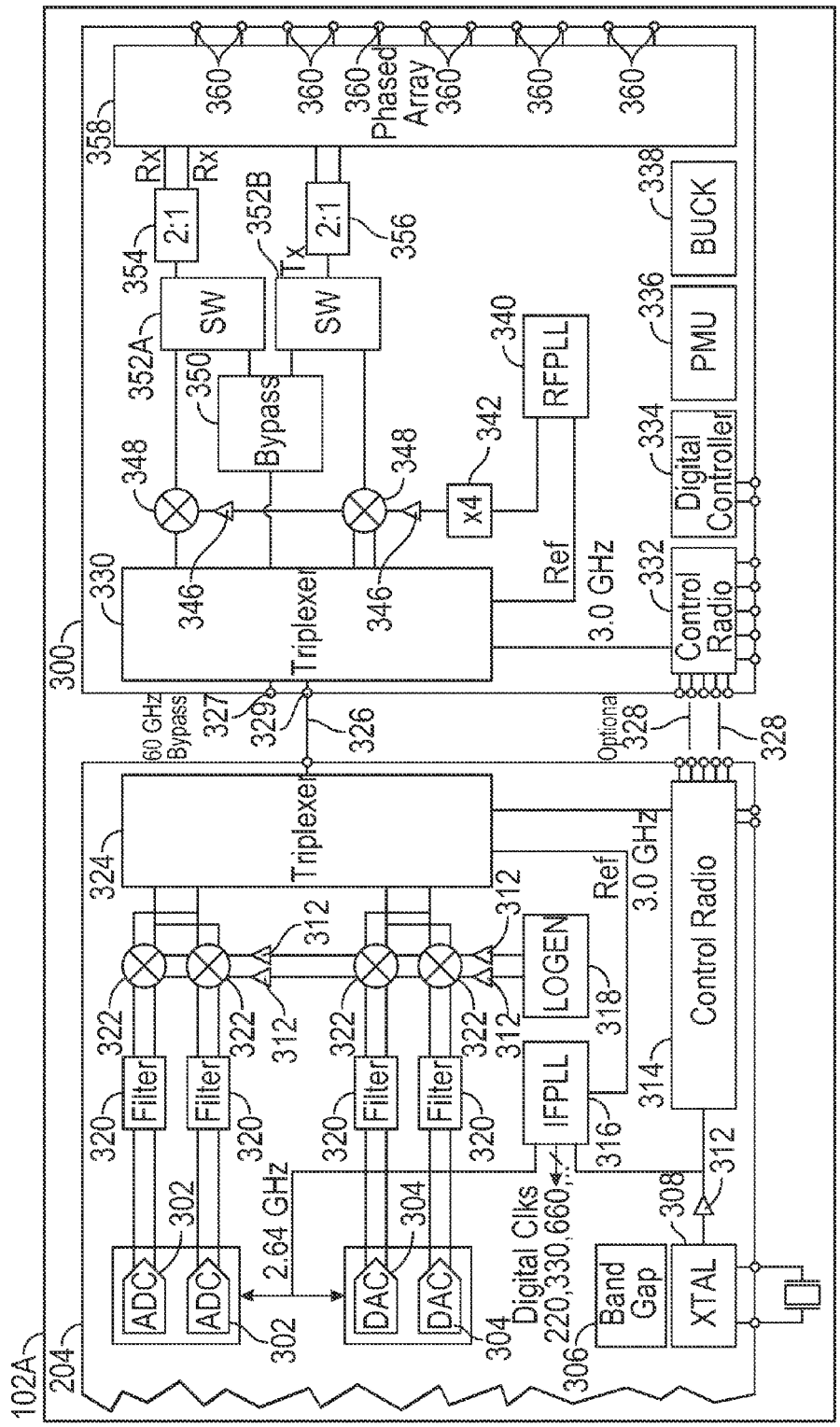
FIG. 3 illustrates an example base station device implementing a scalable radio frequency communication system in accordance with one or more implementations.

FIG. 3 illustrates an example base station device 102A implementing a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The base station device 102A includes a baseband processor 204 and a modular RFIC 300. For explanatory purposes the baseband processor 204 and the modular RFIC 300 are illustrated as being included in the base station device 102A. However, the baseband processor 204 and/or the modular RFIC 300 may be included in one or more of the other base station devices 102B-E and/or one or more of the user devices 104A-C.

The baseband processor 204 is coupled to the modular RFIC 300 via a transmission media 326, and an optional control transmission media 328, either of which may be, for example, coaxial transmission media. The baseband processor 204 includes one or more analog to digital converters (ADCs) 302, one or more digital to analog converters (DAC) 304, a bandgap voltage reference circuit 306, a crystal oscillator 308, an amplifier 312, such as a power amplifier, a control radio 314, an intermediate frequency phase-locked loop (IFPLL) 316, a local oscillator generator (LOGEN) 318, one or more amplifiers 312, such as power amplifiers, one or more filters 320, one or more mixers 322, and a triplexer 324.

The modular RFIC 300 includes an RF communication pin 327, an IF communication pin 329, a triplexer 330, a control radio 332, a digital controller 334, a power management unit (PMU) 336, a buck regulator 338, a radio frequency phase-locked loop (RFPLL) 340, a multiplier 342, one or more amplifiers 346, such as low noise amplifiers (LNAs) or power amplifiers (PAs), a bypass circuit 350, one or more switches 352A-B, a combiner circuit 354, a splitter circuit 356, a phased array circuitry 358, and one or more communication pins 360.

The modular RFIC 300 can be configured to operate in a first mode of operations as a primary RFIC and in a second mode of operation as a secondary RFIC. In the example base station device 102A illustrated in FIG. 1, the modular RFIC 300 is configured to operate as a primary RFIC. When the modular RFIC 300 is operating as a primary RFIC, the modular RFIC 300 is coupled to the baseband processor 204 via the IF communication pin 329 and the transmission media 326. In this manner, the modular RFIC 300 receives an IF signal from the baseband processor 204 over the transmission media 326 and through the IF communication pin 329. Similarly, the modular RFIC 300 transmits an IF signal to the baseband processor 204 through the IF communication pin 329 and over the transmission media 326.

Thus, when the modular RFIC 300 is operating as the primary RFIC, an IF signal (e.g. 10-15 GHz, such as 10.56 GHz) is received from the baseband processor 204, passed through the triplexer 330 to the mixer 348, and upconverted by the mixer 348 to an RF signal, e.g. 28 GHz, 30 GHz, 60 GHz, 70 GHz, etc. The switch 352B is configured (when the modular RFIC 300 is operating as the primary RFIC) to pass the RF signal from the mixer 348 to the splitter circuit 356, where the RF signal is split and the resulting multiple RF signals are passed to the phased array circuitry 358. The phased array circuitry 358 phase shifts the RF signals, as appropriate to implement directional beamforming, and transmits the RF signals via the communication pins 360. In a single chip implementation, the communication pins 360 of the modular RFIC 300 operating as the primary RFIC are coupled to antenna elements, and the RF signals are transmitted via the antenna elements, e.g. to an external device. In a multi-chip implementation, the communication pins 360 of the modular RFIC 300 operating as the primary RFIC as coupled to one or more transmission media, such as waveguides, for transmitting the RF signals to one or more secondary RFICs.

Similarly, when the modular RFIC 300 is operating as the primary RFIC, RF signals received over the communication pins 360 (from an external device or one or more secondary RFICs) are phase shifted by the phased array circuitry 358 and the RF signals are combined by the combiner circuit 354. The switch 352A is configured (when the modular RFIC 300 is operating as the primary RFIC) to pass the combined RF signal through the mixer 348 for downconverting the RF signal (e.g. 60 GHz) to an IF signal (e.g. 10-15 GHz). The downconverted RF signal is transmitted by the triplexer 330 to the baseband processor 204 via the IF communication pin 329 and the transmission media 326.

The modular RFIC 300, when operating as the primary RFIC, may also receive control information from the baseband processor 204. For example, the baseband processor 204 may transmit control information associated with the modular RFIC 300 (and/or one or more secondary RFICs coupled thereto) via the control radio 314 of the baseband processor 204. The control radio 332 of the modular RFIC 300 receives the control information over the transmission media 328. The control radio 332 and/or the digital controller 334 of the modular RFIC 300 determines whether the control information is associated with the modular RFIC 300 and/or one or more secondary RFICs coupled thereto. When the control information is associated with one or more of the secondary RFICs, the control radio 332 transmits the appropriate control information the modular RFIC 300 to the appropriate secondary RFICs via an out-of-band communication channel. In one or more implementations, the out-of-band communication channel may be separate transmission media that is coupled to the control radio 332 of the modular RFIC 300 and separate control radios of each of the secondary RFICs.

The modular RFIC 300 may also be configured to operate as a secondary RFIC. When operating as a secondary RFIC, the modular RFIC 300 is not coupled to the baseband processor 204 via the IF communication pin 329 and the transmission media 326, but rather is coupled to a primary RFIC by the RF communication pin 327 and another transmission media, such as a waveguide (not shown). Thus, when the modular RFIC 300 is operating as a secondary RFIC, the RF communication pin 327 receives an RF signal from a primary RFIC, which is passed from the triplexer 330 to the bypass circuit 350. The bypass circuit 350 passes the RF signal to the switch 352B which is configured (when the modular RFIC 300 is operating as the secondary RFIC) to pass the RF signal directly to the splitter circuit 356, bypassing the mixer 348. The splitter circuit 356 splits the RF signal into multiple RF signals, which are then phase shifted by the phased array circuitry 358 and transmitted via a number of antenna elements (not shown) that are coupled to the communication pins 360.

Similarly, RF signals received via the antenna elements pass through the communication pins 360 to the phased array circuitry 358 for phase shifting and are then combined by the combiner circuit 354. The switch 352A is configured (when the modular RFIC 300 is operating as the secondary RFIC) to pass the combined RF signal to the bypass circuit 350, which bypasses the mixer 348, and passes the RF signal directly to the triplexer 330 for transmission over the RF communication pin 327 to the primary RFIC. Thus, each of the switches 352A-B passes signals through a first path when the modular RFIC 300 is operating as a primary RFIC, and passes signals through a second path when the modular RFIC 300 is operating as a secondary RFIC.

When operating as the secondary RFIC, the modular RFIC 300 receives control information from a primary RFIC via the control radio 332. The control information may include, for example, power control information, phase shifting information, gain/power amplification information, etc. The digital controller 334 may process the control information and may effectuate the control information by adjusting one or more phase shifters of the phased array, adjusting automatic gain control (AGC), powering up or down one or more components of the modular RFIC 300, or generally any control actions that may be performed/effectuated by the digital controller 334.

In one or more implementations, one or more of the baseband processor 204, the ADCs 302, the DACs 304, the bandgap voltage reference circuit 306, the crystal oscillator 308, the amplifiers 312, the control radio 314, the IFPLL 316, the LOGEN 318, the filters 320, the mixers 322, the triplexer 324, the modular RFIC 300, the triplexer 330, the control radio 332, the digital controller 334, the PMU 336, the buck regulator 338, the RFPLL 340, the multiplier 342, the amplifiers 346, the bypass circuit 350, the switches 352A-B, the combiner circuit 354, the splitter circuit 356, the phased array circuitry 358, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 4:
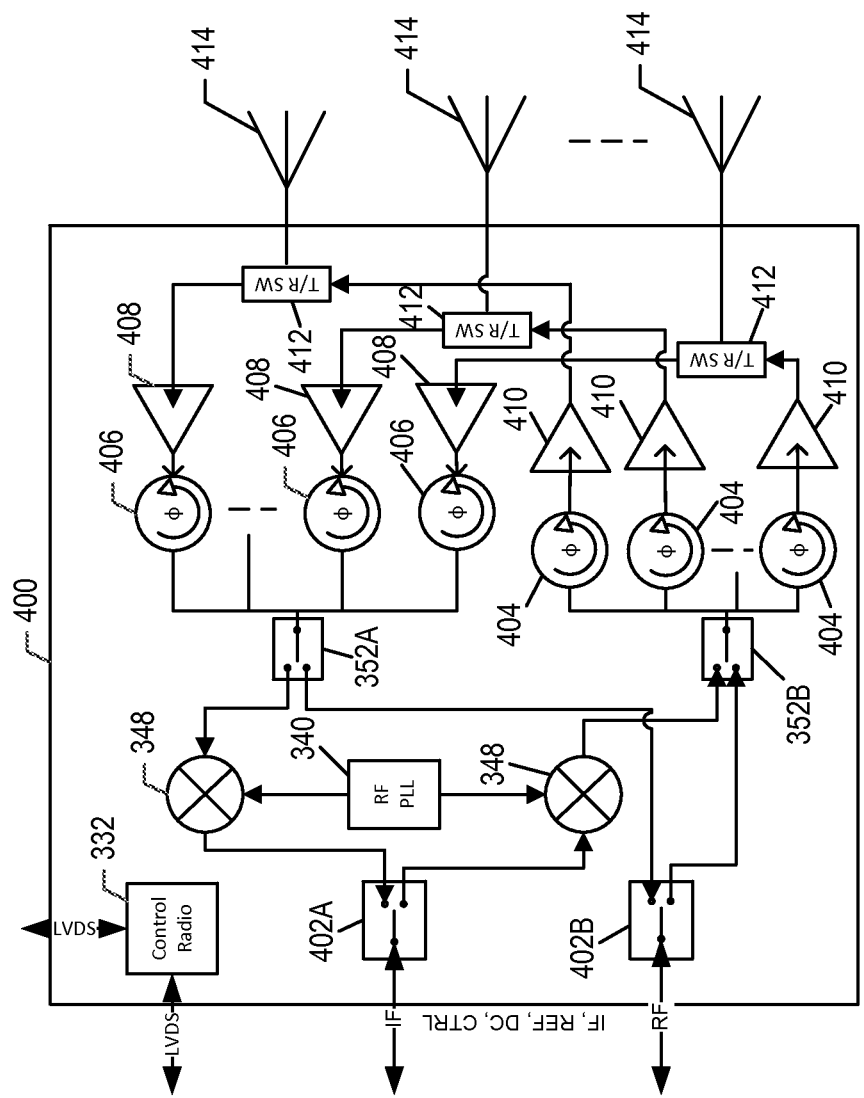
FIG. 4 illustrates an example modular radio frequency integrated circuit (RFIC) that may be implemented in a scalable radio frequency communication system in accordance with one or more implementations.

FIG. 4 illustrates an example modular radio frequency integrated circuit (RFIC) 400 that may be implemented in a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The modular RFIC 400 is similar to the modular RFIC 300, with additional detail illustrated with respect to the phased array circuitry 358 of FIG. 3. The modular RFIC 400 includes the control radio 332, the switches 402A-B, the RFPLL 340, the mixers 348, the switches 352A-B, transmit phase shifters 404, power amplifiers 410, transmit/receive switches 408, low noise amplifiers 408, and receive phase shifters 406. The transmit phase shifters 404 and the receive phase shifters 406 may be configurable phase shifters, steerable phase shifters, or generally any phase shifters that can implement directional beamforming. The modular RFIC 400 is illustrated in FIG. 4 as being coupled to one or more antenna elements 414. However, when the modular RFIC 400 is operating as a primary RFIC, the modular RFIC is coupled to one or more transmission media for transmitting RF signals to the secondary RFICs, rather than the antenna elements 414.

As discussed above with respect to FIG. 3, when the modular RFIC 400 is operating as a primary RFIC, the switch 352A is set in a first position that passes combined received RF signals through the mixer 348 for downconverting to IF signals. The IF signals are then transmitted to the baseband processor 204 via the switch 402A. Similarly, when the modular RFIC 400 is operating as a primary RFIC, the switch 352B is set in a first position that receives upconverted RF signals from the mixer 348 and passes the RF signals to the phase shifters 404.

When the modular RFIC 400 is operating as the primary RFIC, the control radio 332 receives control information from the baseband processor 204, e.g. via low voltage differential signaling (LVDS). If the control information is addressed to the modular RFIC 400, the modular RFIC adjusts one or more components appropriately. If the control information is addressed to one or more secondary RFICs coupled to the modular RFIC 400, the control radio 332 transmits the control information to the appropriate one or more secondary RFICs, e.g. via LVDS. In this manner, the control radio 332 may be considered a control relay in that the control radio 332 relays control information from the baseband processor 204 to one or more secondary RFICs.

When the modular RFIC 400 is operating as a secondary RFIC, the switch 352A is set in a second position that passes RF signals directly to the switch 402B (bypassing the mixer 348) for transmission at RF to a primary RFIC. Similarly, when the modular RFIC 400 is operating as a secondary RFIC, the switch 352B is set in a second position that receives RF signals from the switch 402B and passes the RF signals to the phase shifters 404. The control radio 332 of the modular RFIC 400, when operating as the secondary RFIC, receives control information from a primary RFIC, e.g. via LVDS. The modular RFIC 400 may then adjusts one or more components appropriately based at least in part on the received control information.

In one or more implementations, one or more of the modular RFIC 400, the control radio 332, the switches 402A-B, the RFPLL 340, the mixers 348, the switches 352A-B, the transmit phase shifters 404, the power amplifiers 410, the transmit/receive switches 412, the low noise amplifiers 408, the receive phase shifters 406, the antenna elements 414, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 5:
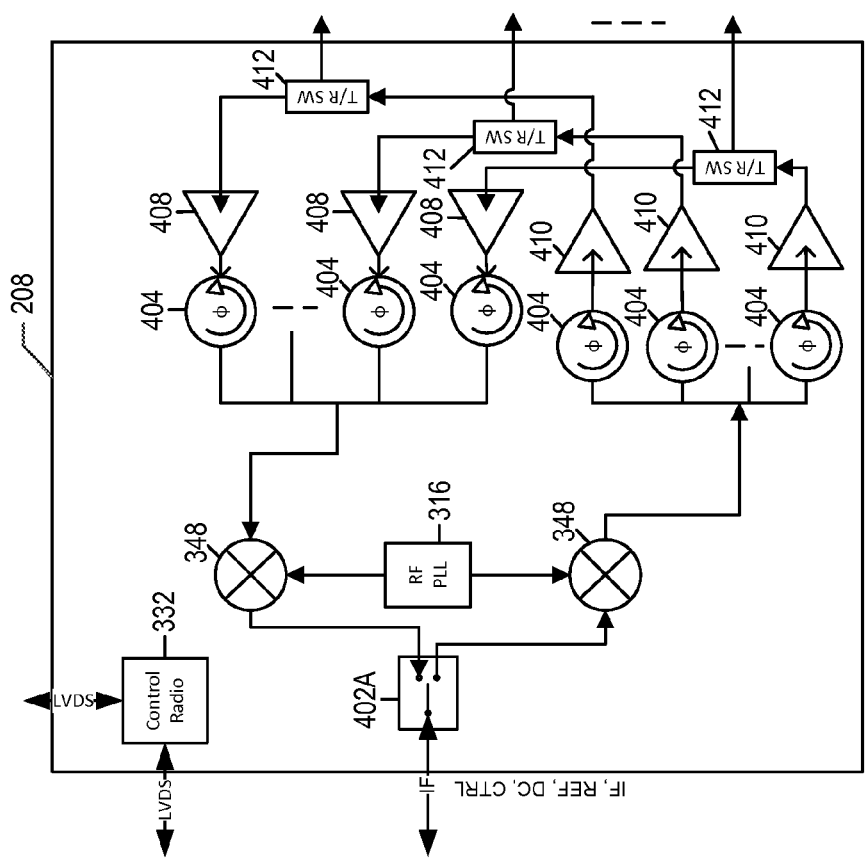
FIG. 5 illustrates a primary RFIC that may be implemented in a scalable radio frequency communication system in accordance with one or more implementations.

FIG. 5 illustrates a primary RFIC 208 that may be implemented in a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The primary RFIC 208 is similar to the modular RFICs 300, 400 discussed above with respect to FIGS. 3 and 4. However, the primary RFIC 208 is dedicated to operating as a primary RFIC, and therefore the primary RFIC 208 does not include the additional components of the modular RFICs 300, 400 that allow the modular RFICs 300,400 to be configured as either a primary RFIC or a secondary RFIC. In this manner, the primary RFIC 208 conserves surface area and/or chip space, e.g. by excluding the modular components and the components specific to the secondary RFIC, and therefore the primary RFIC 208 may be implemented in a smaller footprint than the modular RFICs 300, 400.

The primary RFIC 208 includes the control radio 332, the switch 402A, the RFPLL 340, the mixers 348, the transmit phase shifters 404, the power amplifiers 410, the transmit/receive switches 412, the low noise amplifiers 408, and the receive phase shifters 406. The primary RFIC 208 operates similarly as the modular RFICs 300, 400 discussed above with respect to FIGS. 3 and 4, when the modular RFICs 300, 400 are configured to operate as a primary RFIC. In a single chip implementation, the primary RFIC 208 further includes and/or is coupled to antenna elements (not shown) for transmitting RF signals, e.g. to an external device.

In one or more implementations, one or more of the primary RFIC 208, the control radio 332, the switch 402A, the RFPLL 340, the mixers 348, the transmit phase shifters 404, the power amplifiers 410, the transmit/receive switches 412, the low noise amplifiers 408, the receive phase shifters 406, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 6:
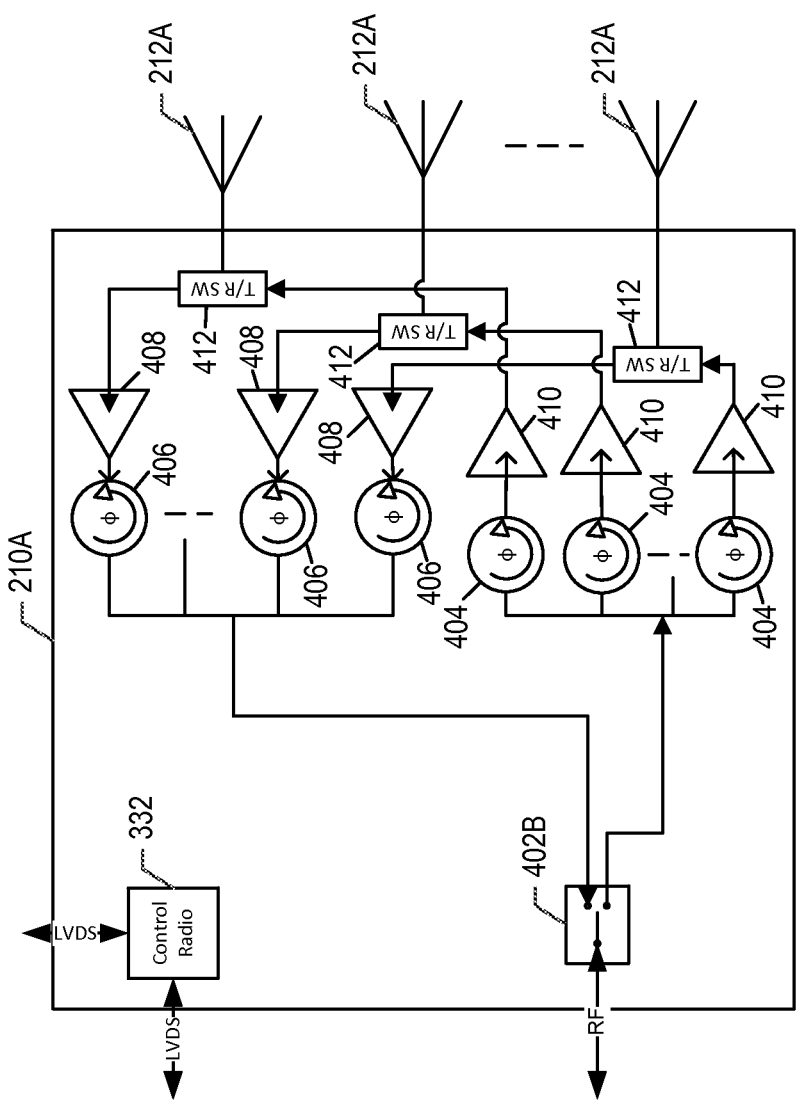
FIG. 6 illustrates a secondary RFIC that may be implemented in a scalable radio frequency communication system in accordance with one or more implementations.

FIG. 6 illustrates a secondary RFIC 210A that may be implemented in a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The secondary RFIC 210A is similar to the modular RFICs 300, 400 discussed above with respect to FIGS. 3 and 4. However, the secondary RFIC 210A is dedicated to operating as a secondary RFIC, and therefore the secondary RFIC 210A does not include the additional components of the modular RFICs 300, 400 that allow the modular RFICs 300, 400 to be configured as either a primary RFIC or a secondary RFIC. In this manner, the secondary RFIC 210A conserves surface area and/or chip space, e.g. by excluding the modular components and the components specific to the primary RFIC, and therefore may be implemented in a smaller footprint than the modular RFICs 300, 400.

The secondary RFIC 210A includes the control radio 332, the switch 402B, the transmit phase shifters 404, the power amplifiers 410, the transmit/receive switches 412, the low noise amplifiers 408, and the receive phase shifters 406. The secondary RFIC 210A operates similarly as the modular RFICs 300, 400 discussed above with respect to FIGS. 3 and 4, when the modular RFICs 300, 400 are configured to operate as a secondary RFIC.

In one or more implementations, one or more of the secondary RFIC 210A, the control radio 332, the switch 402B, the transmit phase shifters 404, the power amplifiers 410, the transmit/receive switches 412, the low noise amplifiers 408, the receive phase shifters 406, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 7:
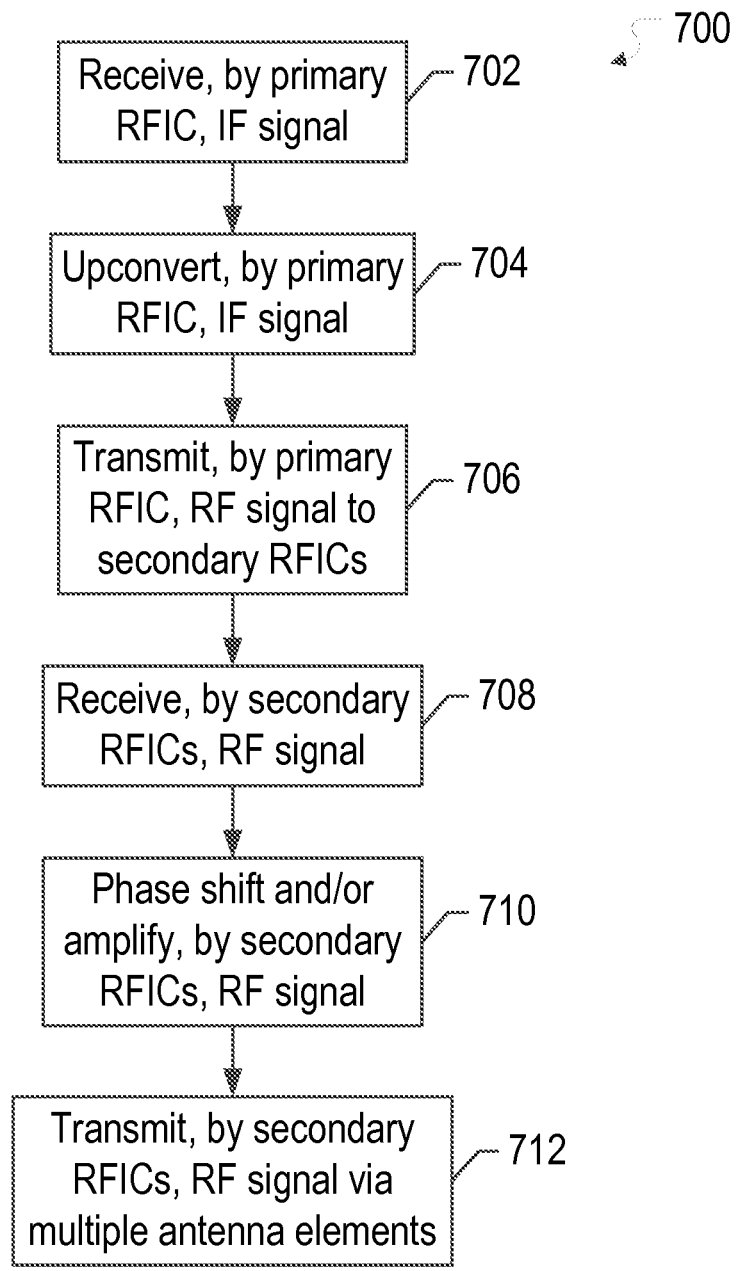
FIG. 7 illustrates a flow diagram of an example process of a scalable radio frequency communication system in accordance with one or more implementations.

FIG. 7 illustrates a flow diagram of an example process 700 of a scalable radio frequency communication system 206 in accordance with one or more implementations. For explanatory purposes, the example process 700 is described herein with reference to the scalable radio frequency communication system 206 of FIG. 2; however, the example process 700 is not limited to the scalable radio frequency communication system 206 of FIG. 2. Further for explanatory purposes, the blocks of the example process 700 are described herein as occurring in serial, or linearly. However, multiple blocks of the example process 700 may occur in parallel. In addition, the blocks of the example process 700 need not be performed in the order shown and/or one or more of the blocks of the example process 700 need not be performed.

The primary RFIC 208 receives an IF signal from the baseband processor 204 (702). The primary RFIC 208 upconverts the IF signal to RF, e.g. using the mixer 348 (704). The primary RFIC 208 phase shifts and amplifies the RF signal and transmits the RF signal to one or more secondary RFICs 210A-E (706). The RF signals may be transmitted to the secondary RFICs 210A-E via a waveguide or other transmission media. In one or more implementations, the transmission media may be implemented on a printed circuit board (PCB) that includes the primary RFIC 208 and at least one of the secondary RFICs 210A-E.

The RF signal is received by one or more of the secondary RFICs 210A-E (708). The RF signal is appropriately phase shifted and/or amplified by each of the one or more secondary RFICs 210A-E (710), e.g. based at least in part on control information received from the baseband processor 204 (via the primary RFIC 208). Each of the one or more secondary RFICs 210A-E transmits the RF signal via multiple antenna elements, such as tens, hundreds, or thousands of antenna elements for each of the one or more secondary RFICs 210A-E (712).

The example process 700 can be effectively reversed for RF signals received by the secondary RFICs 210A-E over the antenna elements. That is, the RF signals may be received by one or more of the secondary RFICs 210A-E over the antenna elements, amplified and phase shifted, and transmitted (as RF signals) to the primary RFIC 208. The primary RFIC 208 downconverts the received RF signals to IF and transmits the IF signals to the baseband processor 204

Figure 8:
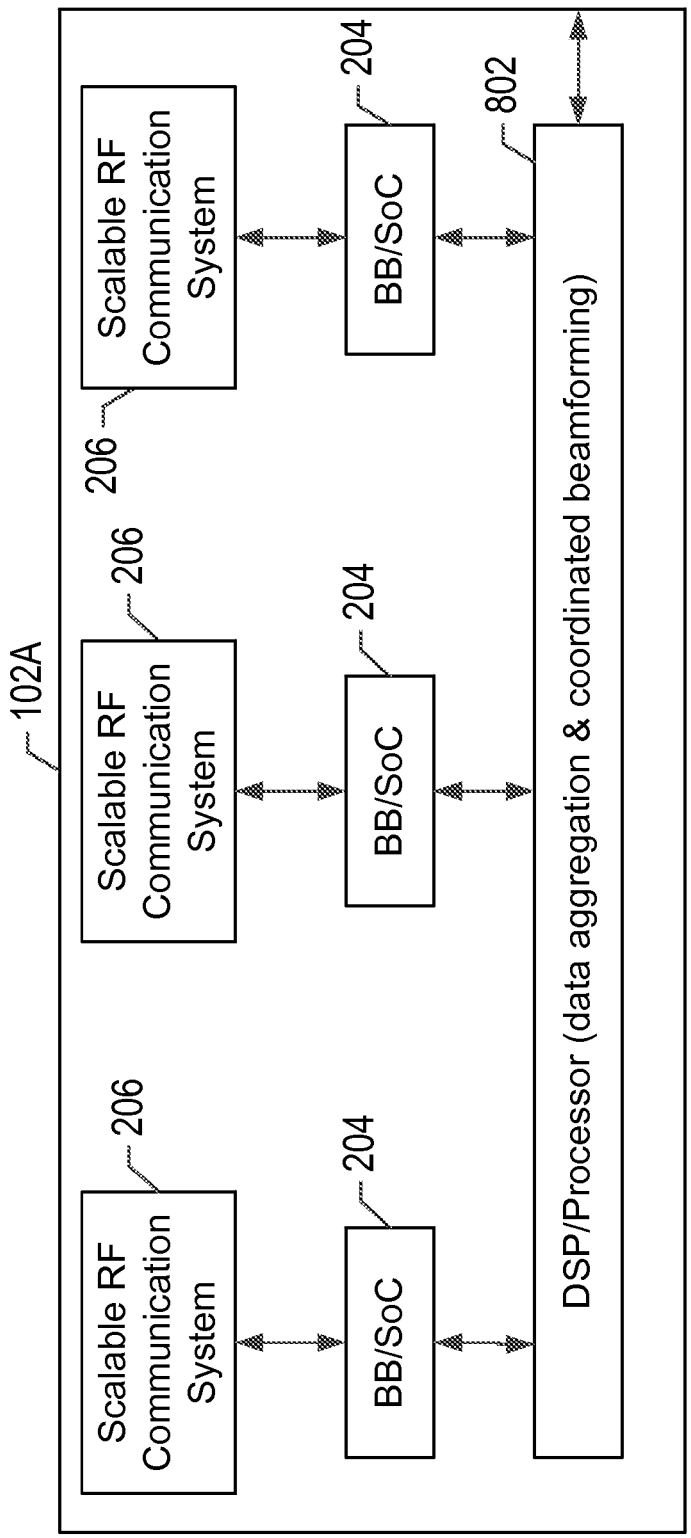
FIG. 8 illustrates an example base station device implementing multiple scalable radio frequency communication systems in accordance with one or more implementations.

FIG. 8 illustrates an example base station device 102A implementing multiple scalable radio frequency communication systems 206 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The base station device 102A includes multiple scalable RF communication systems 206, each of which is coupled to a baseband processor 204. Each of the scalable RF communication systems 206 may be the scalable RF communication system 206 discussed above with respect to FIG. 2, or a variation thereof. The baseband processors 204 are each coupled to digital signal processor (DSP) 802. The DSP 802 performs data aggregation and coordinates beamforming amongst the scalable RF communication systems. The DSP 802 may transmit control information, such as phase shifting information, and/or data signals to each of the baseband processors 204. The baseband processors 204 transmit the control information and/or data signals to the respective primary RFICs 208, and the primary RFICs 208 propagate the control information and/or data signals to the secondary RFICs 210A-E.

In one or more implementations, one or more of the scalable RF communication systems 206, the baseband processors 204, the DSP 802, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 9:
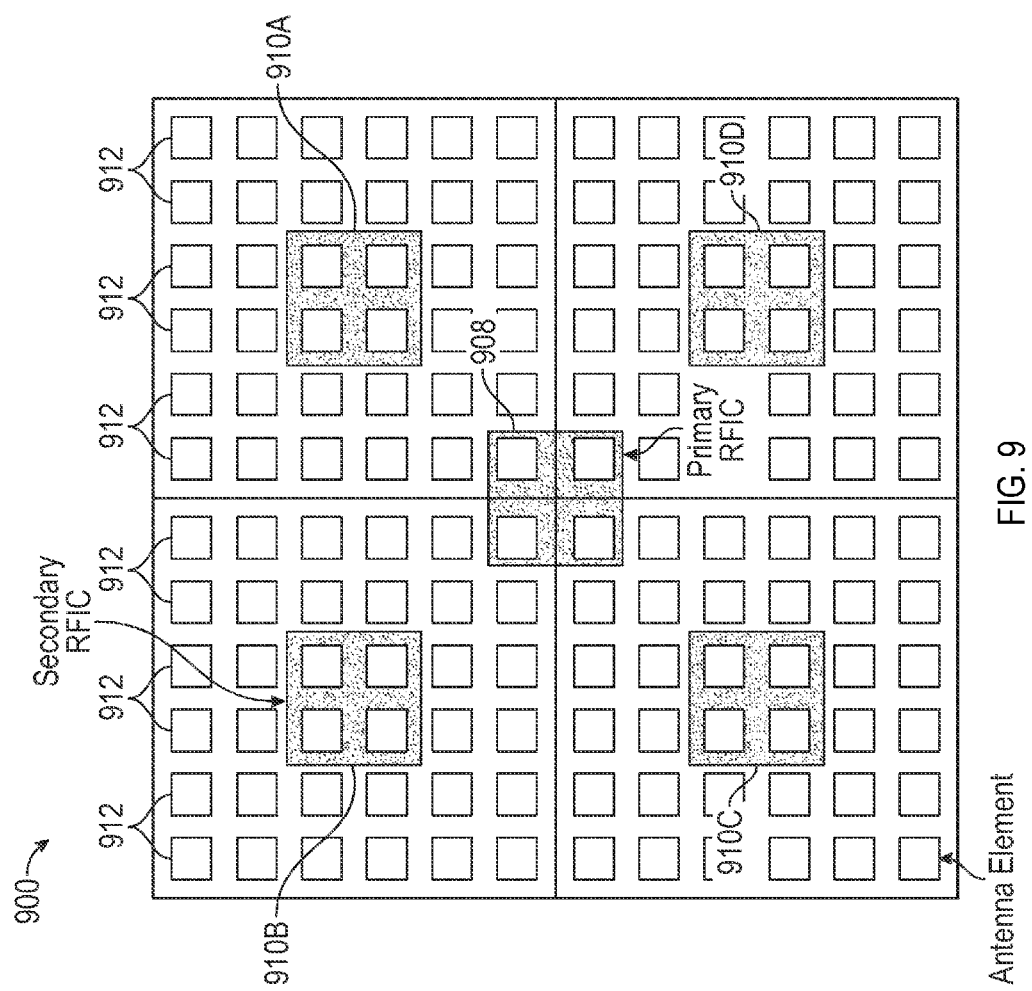
FIG. 9 illustrates an example layout of a scalable radio frequency communication system in accordance with one or more implementations.

FIG. 9 illustrates an example layout 900 of a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The layout 900 includes a primary RFIC 908 and multiple secondary RFICs 912A-D. Each of the secondary RFICs 912A-D is coupled to a number of antenna elements 912. For explanatory purposes, only one row of the antenna elements 912 is labeled in FIG. 9; however, each of the squares surrounding/overlapping the RFICs 912A-D represents antenna elements. The relative proximity of the secondary RFICs 910A-D to the primary RFIC 908 may facilitate transmitting the RF signals between the primary RFIC 908 and the secondary RFICs 910A-D.

Figure 10:
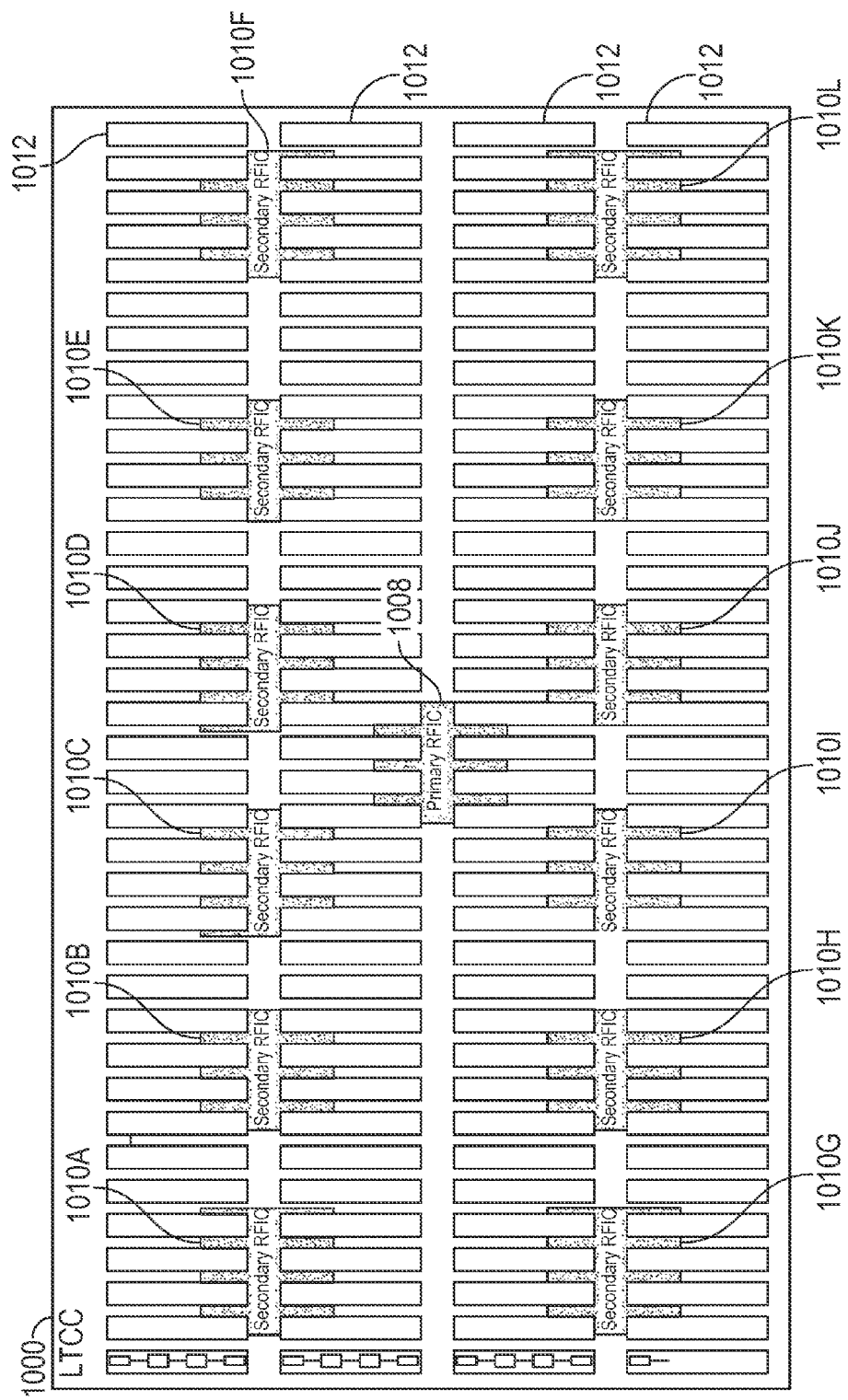
FIG. 10 illustrates an example substrate of a scalable radio frequency communication system in accordance with one or more implementations.

FIG. 10 illustrates an example substrate 1000 of a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The substrate 1000 may be, for example, a ceramic substrate, such as a low temperature co-fired ceramic (LTCC) substrate, a silicon substrate, or generally any substrate. The substrate 1000 includes a primary RFIC 1008, secondary RFICs 1010A-L and subarrays of antenna elements 1012. The primary RFIC 1008 and the secondary RFICs 1010A-L may be attached to a first surface of the substrate 1000. The subarrays of antenna elements 1012 are then attached to the first surface of the substrate 1000 and/or a first surface of the RFICs 1008, 1010A-L. For explanatory purposes, only a single column of the subarrays of antenna elements 1012 is labeled in FIG. 10; however, each of the rectangles in FIG. 10 represents one of the subarrays of antenna elements 1012.

In FIG. 10, the twelve secondary RFICs 1010A-L may each include twelve RF transmit/receive (Tx/Rx) ports for a total of 144 ports. Each of the Tx/Rx ports may drive one of the subarrays of antenna elements 1012, such as a 1×4 subarray which consists of a four element vertical linear array of printed radiators (patches). Thus, in this instance there may be 576 antenna elements over the substrate 1000.

The array aperture in FIG. 10 may be approximately 50 millimeters by 85 millimeters with the 576 elements breaking down, in one example, to 36 by 16. The azimuth plane may scan to +/−60 degrees while the elevation plane may have a limited scan of +/−3 degrees. The azimuth half-power beamwidth may be 3-4 degrees, such as, for example, 3.5 degrees. The single element gain may be 3 dBi. When the substrate 1000 is LTCC, the loss of the LTCC may be 1 dB/cm. Wafer Level Chip Scale Packaging (WLCSP) may be applied directly to the antenna substrate.

Thus, the integration of multiple RFICs 1008, 1010A-L may be performed at the package or board level. In package level integration, the dies are integrated within a single package such that each secondary RFIC 1010A-L is placed under the subarrays of antenna elements 1012 associated with each secondary RFIC 1010A-L to minimize the RF signal (e.g. 60 GHz) routing loss from the last stage of the power amplifiers to the subarrays of antenna elements 1012. In one or more implementations, multiple package RFICs (one or more as a primary RFIC 1008 and several secondary RFICs 1010A-L) may be used for integration at the board level to provide a highly directional antenna array.

Figure 11:
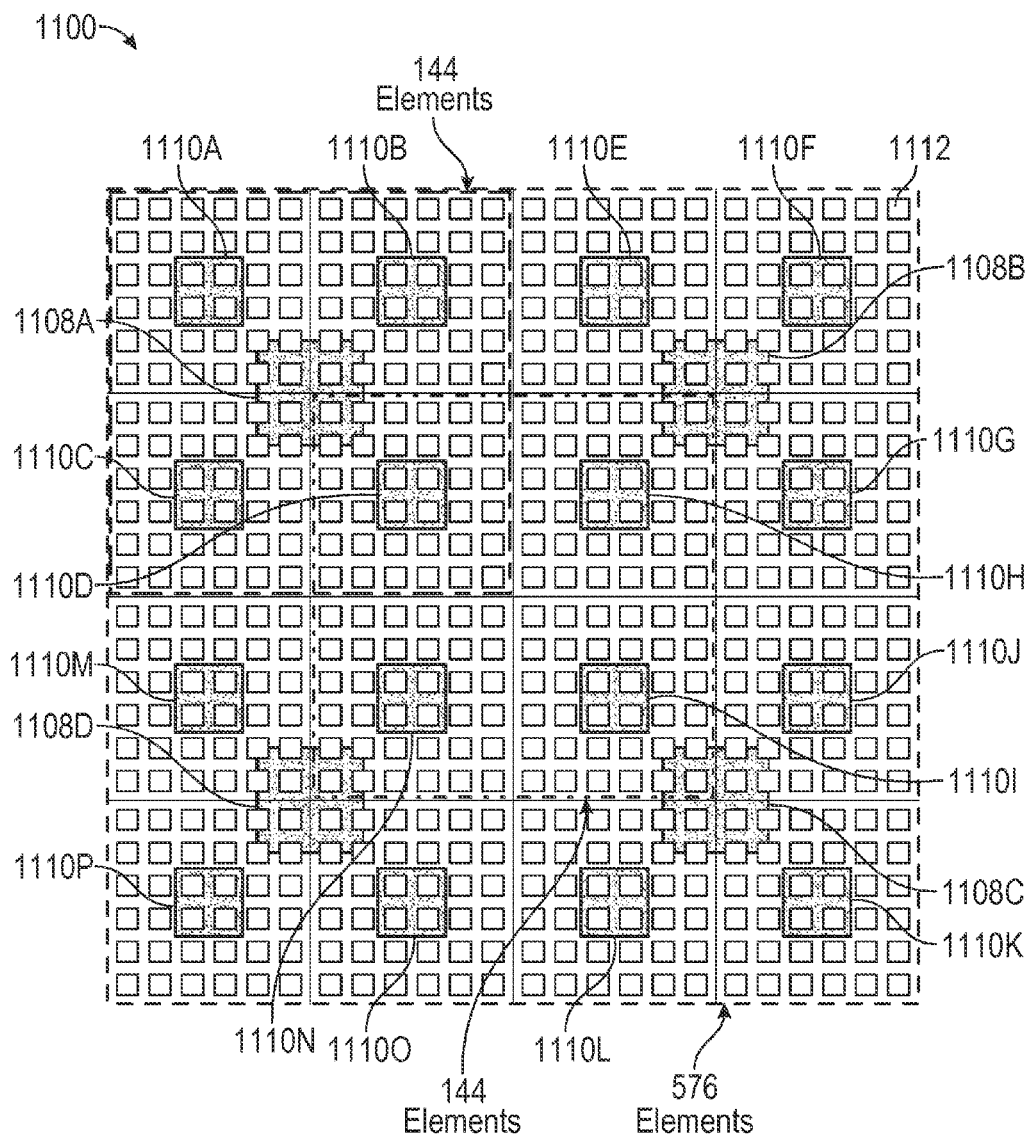
FIG. 11 illustrates an example layout of a multi-tier scalable radio frequency communication system in accordance with one or more implementations.

FIG. 11 illustrates an example layout 1100 of a multi-tier scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The layout 1100 includes multiple primary RFICs 1108A-D each of which is coupled to multiple secondary RFICs 1110A-P. Each of the secondary RFICs 1110A-P is coupled to a number of antenna elements 1112. For explanatory purposes, a single antenna element 1112 is labeled in FIG. 11; however, each of the squares in FIG. 11 represents an antenna element 1112. Similar to the multiple scalable RF communication systems 206 of FIG. 8, each of the primary RFICs 1108A-D may be coupled to separate baseband processors 204 and each of the baseband processors 204 may be coupled to a DSP 802. The DSP 802 may perform data aggregation and may coordinate beamforming across all of the primary RFICs 1108A-D.

Figure 12:
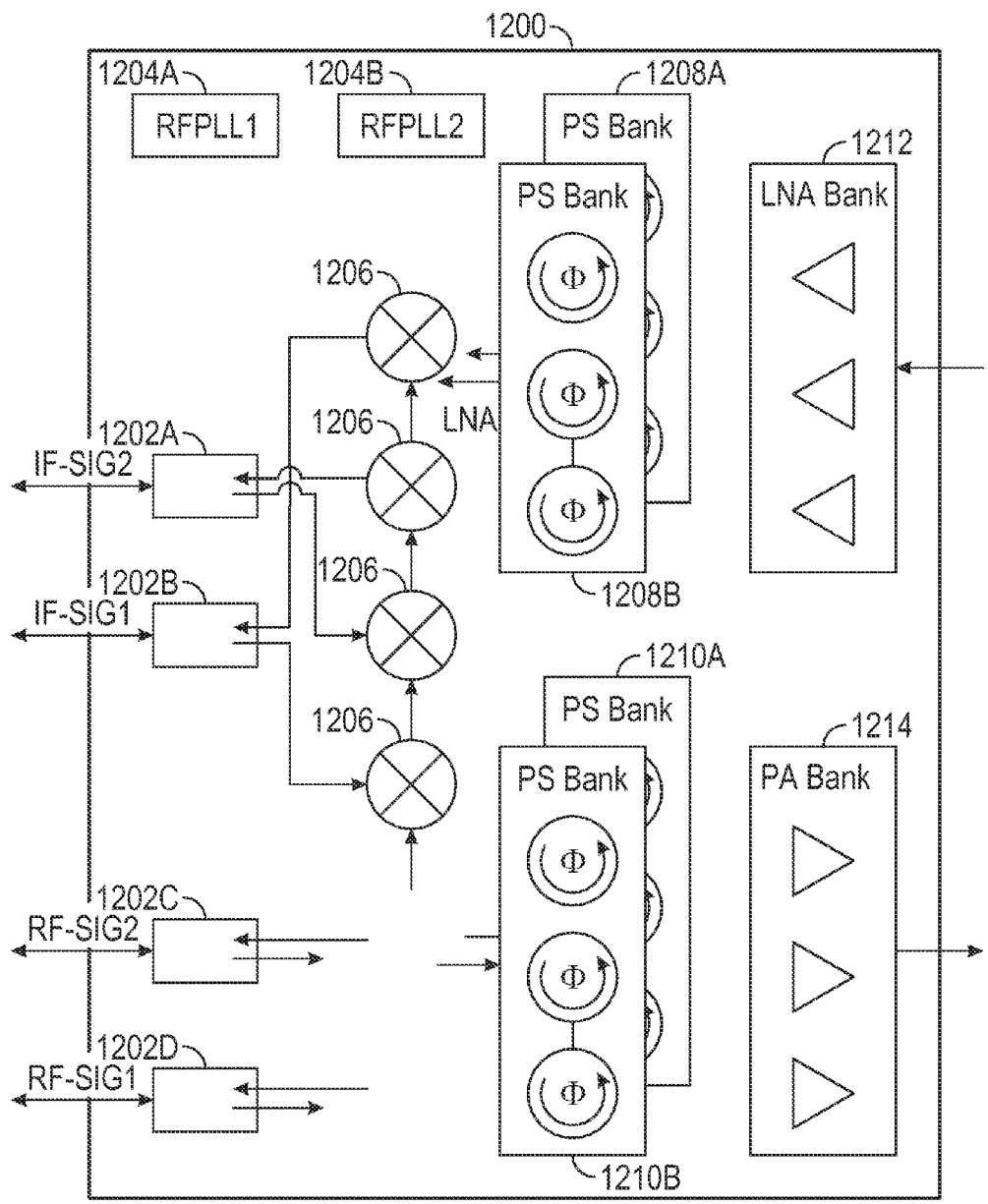
FIG. 12 illustrates an example multi-stream modular RFIC that may be implemented in a scalable radio frequency communication system in accordance with one or more implementations.

FIG. 12 illustrates an example multi-stream modular RFIC 1200 that may be implemented in a scalable radio frequency communication system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The multi-stream modular RFIC 1200 operates similarly as the modular RFICs 300, 400 discussed above; however, the multi-stream modular RFIC 1200 can simultaneously communicate multiple streams, rather than the single stream supported by the modular RFICs 300, 400. The multi-stream modular RFIC 1200 includes switches 1202A-D, RFPLLs 1204A-B, mixers 1206, receive phase shifter banks 1208A-B, transmit phase shifter banks 1210A-B, an LNA bank 1212, and a PA bank 1214. The phase shifter banks 1208A-B, 1210A-B may each include multiple phase shifters, the LNA bank 1212 may include multiple LNAs, and the PA bank 1214 may include multiple PAs.

The switches 1202A-B are each configured to communicate multiple IF signals, e.g. to the baseband processor 204, and the switches 1202C-D are each configured to communicate multiple RF signals, e.g. to another multi-stream modular RFIC 1200 operating as a primary multi-stream RFIC. Similar to the modular RFICs 300, 400, the multi-stream modular RFIC 1200 may further include a control radio (not shown) and/or one or more switches (not shown) for switching between operating as a primary multi-stream RFIC, e.g. communicating multiple IF signals using the switches 1202A-B and the mixers 1206, and operating as a secondary multi-stream RFIC, e.g. communicating multiple RF signals using the switches 1202C-D.

Similar to the modular RFICs 300, 400, when the multi-stream modular RFIC 1200 is operating as a primary RFIC in a multi-chip implementation, at least two communication pins (not shown) of the multi-stream modular RFIC 1200 are coupled to each of the secondary multi-stream modular RFICs supported by the multi-stream modular RFIC 1200, e.g. via transmission media (not shown). When the multi-stream modular RFIC 1200 is operating as a primary RFIC in a single-chip implementation, the communication pins of the multi-stream modular RFIC 1200 are each coupled to separate antenna elements, and/or subarrays of antenna elements (not shown). Similarly, when the multi-stream modular RFIC 1200 is operating as a secondary multi-stream modular RFIC, the communication pins of the multi-stream modular RFIC 1200 are each coupled to separate antenna elements, and/or subarrays of antenna elements.

Further in this regard, when the multi-stream modular RFIC 1200 is operating as a secondary multi-stream RFIC, the transmit phase shifter banks 1208A-B are configured to beamform two separate beams to transmit the two separate streams via the antenna elements, while the receive phase shifter banks 1210A-B are configured to beamform two separate beams to receive two separate stream via the antenna elements, as is discussed further below with respect to FIG. 13. Thus, the LNA bank 1212, the PA bank 1214 and the antenna elements may be shared by each of the streams. Accordingly, the streams may share a common phase noise profile in MIMO communications.

In one or more implementations, the multi-stream modular RFIC 1200 can support 12 antenna elements, 16 antenna elements, or generally any number of antenna elements. The multi-stream modular RFIC 1200 can operate as an RF-to-RF phased array, e.g. when configured as a secondary multi-stream RFIC, or as an IF-to-RF phased array, e.g. when configured as a primary multi-stream RFIC. In one or more implementations, the multi-stream modular RFIC 1200 may further include an on-chip transmit/receive switch for time division duplex deployments.

In one or more implementations, one or more of the switches 1202A-D, the RFPLLs 1204A-B, the mixers 1206, the receive phase shifter banks 1208A-B, the transmit phase shifter banks 1210A-B, the LNA bank 1212, the PA bank 1214, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 13:
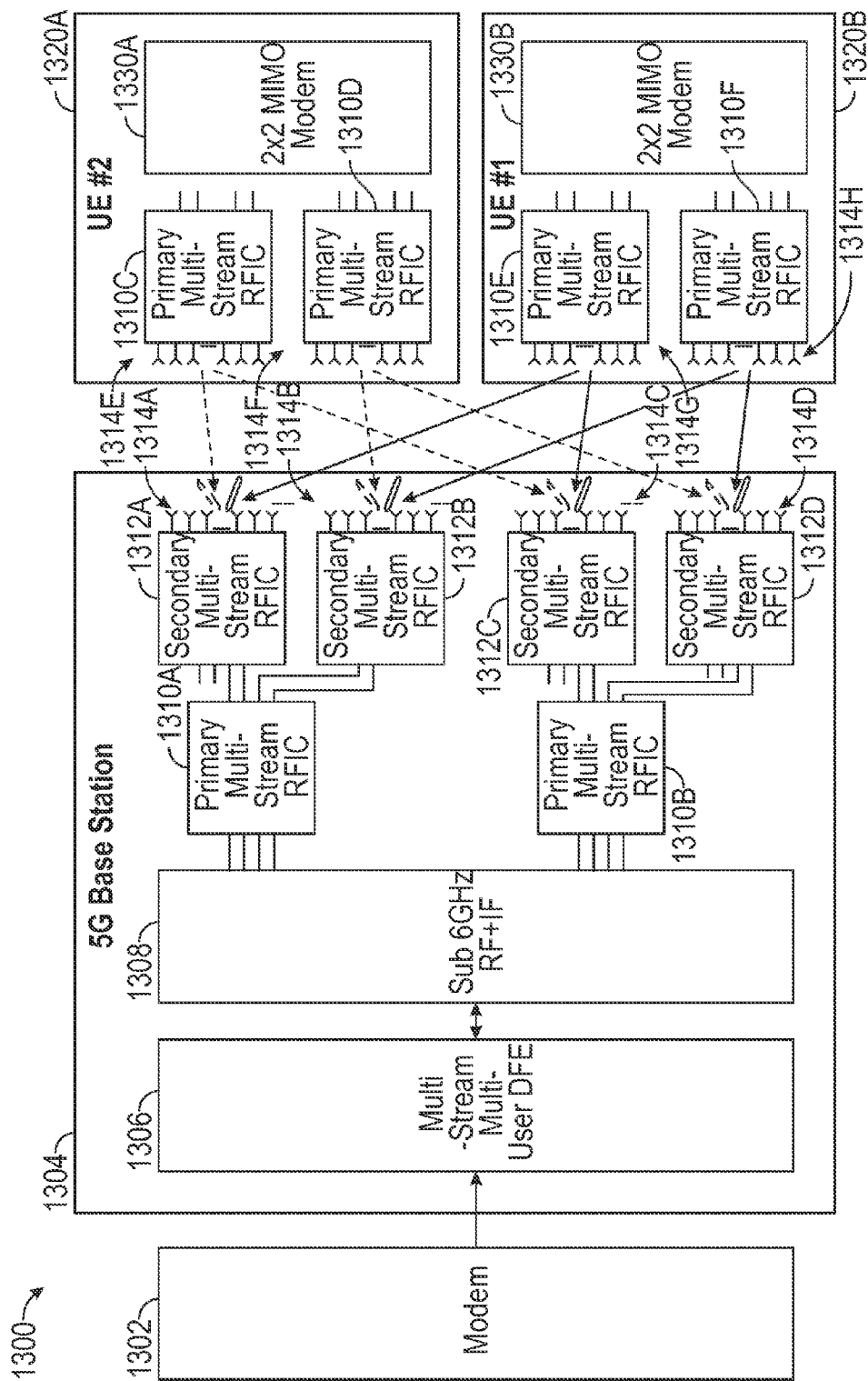
FIG. 13 illustrates an example network environment in which a scalable radio frequency communication system utilizing multi-stream RFICs may be implemented in accordance with one or more implementations.

FIG. 13 illustrates an example network environment 1300 in which a scalable radio frequency communication system utilizing multi-stream RFICs may be implemented in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example network environment 1300 includes a base station device 1304, such as one of the base station devices 102A-E of the network environment 100. The example network environment further includes one or more user devices 1320A-B, such as one or more of the user devices 104A-C of the network environment 100. The base station device 1304 may be communicatively coupled to a modem 1302, such as a MIMO modem (e.g. SU-MIMO and/or MU-MIMO). The base station device 1304 includes a multi-stream multi-user digital front end (DFE) 1306, a transceiver 1308, such as a sub-6 GHz RF and IF transceiver, primary multi-stream RFICs 1310A-B, secondary multi-stream RFICs 1312A-D, and antenna elements 1314A-D.

The primary multi-stream RFICs 1310A-B may each be the multi-stream modular RFIC 1200 that is configured to operate as a primary multi-stream RFIC in a multi-chip implementation, and/or the one or more of the primary multi-stream RFICs 1310A-B may be a dedicated primary multi-stream RFIC in a multi-chip implementation, e.g. a primary multi-stream RFIC that does not include the modular components or the secondary multi-stream RFIC specific components. The secondary multi-stream RFICs 1312A-D may each be the multi-stream modular RFIC 1200 configured to operate as a secondary multi-stream RFIC, and/or one or more of the secondary multi-stream RFICs 1312A-D may be a dedicated secondary multi-stream RFIC, e.g. a secondary multi-stream RFIC that does not include the modular components or the primary multi-stream RFIC specific components.

The user device 1320A includes primary multi-stream RFICs 1310C-D, and a modem 1330A. The user device 1320B includes primary multi-stream RFICs 1310E-F, and a modem 1330B The primary multi-stream RFICs 1310C-F may each be the multi-stream modular RFIC 1200 that is configured to operate as a primary multi-stream RFIC in a single-chip implementation and/or the one or more of the primary multi-stream RFICs 1310C-F may be a dedicated primary multi-stream RFIC in a single-chip implementation, e.g. a primary multi-stream RFIC that does not include the modular components or the secondary multi-stream RFIC specific components. Since the primary multi-stream RFICs 1310C-F are in a single chip implementation, each of the primary multi-stream RFICs 1310C-F is coupled to an array of antennas elements 1314E-H.

In operation, the base station device 1304 transmits multiple streams to the user devices 1320A-B via the antenna elements 1314A-B. The primary multi-stream RFIC 1310A in conjunction with the secondary multi-stream RFICs 1312A-B use beamforming (as discussed above) to transmit four separate streams over the antenna elements 1314A-B, two streams intended for the user device 1320A and two streams intended for the user device 1320B. The primary multi-stream RFIC 1310B in conjunction with the secondary multi-stream RFICs 1312C-D use beamforming (as discussed above) to transmit the same four separate streams over the antenna elements 1314C-D.

The primary multi-stream RFICs 1310C-D of the user device 1320A receive the two streams intended for the user device 1320A from the primary multi-stream RFIC 1310A in conjunction with the secondary multi-stream RFICs 1312A-B, and/or from the primary multi-stream RFIC 1310B in conjunction with the secondary multi-stream RFICs 1312C-D. Similarly, the primary multi-stream RFICs 1310E-F of the user device 1320B receive the two streams intended for the user device 1320B from the primary multi-stream RFIC 1310A in conjunction with the secondary multi-stream RFICs 1312A-B, and/or from the primary multi-stream RFIC 1310B in conjunction with the secondary multi-stream RFICs 1312C-D.

In one or more implementations, one or more of the modem 1302, the multi-stream multi-user DFE 1306, the transceiver 1308, the primary multi-stream RFICs 1310A-F, the secondary multi-stream RFICs 1312A-D, the modems 1330A-B, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 14:
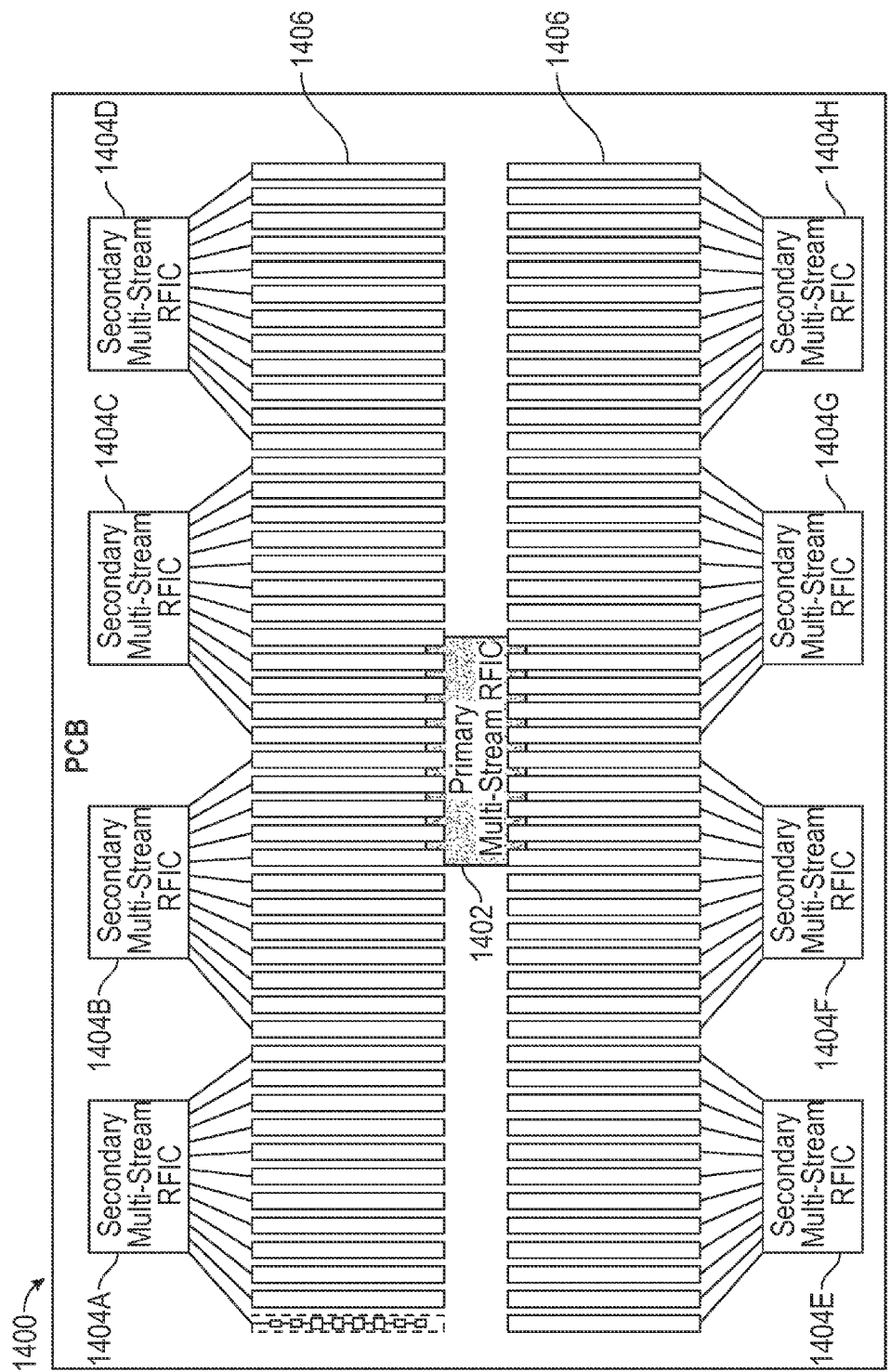
FIG. 14 illustrates an example printed circuit board of a scalable radio frequency communication system utilizing multi-stream RFICs in accordance with one or more implementations.

FIG. 14 illustrates an example printed circuit board (PCB) 1400 of a scalable radio frequency communication system utilizing multi-stream RFICs in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The PCB 1400 includes a primary multi-stream RFIC 1402, one or more secondary multi-stream RFICs 1404A-H, and subarrays of antenna elements 1406. The primary multi-stream RFIC 1402 and the secondary multi-stream RFICs 1404A-H may be attached to a first surface of the PCB 1400. The subarrays of antenna elements 1406 are then attached to the first surface of the PCB 1400 and/or a first surface of the multi-stream RFICs 1402, 1404A-H. For explanatory purposes, only a single column of the subarrays of antenna elements 1406 is labeled in FIG. 14; however, each of the rectangles in FIG. 14 represents one of the subarrays of antenna elements 1406.

In FIG. 14, the eight secondary RFICs 1404A-H may each include twelve RF transmit/receive (Tx/Rx) ports for a total of 96 ports. Each of the Tx/Rx ports may drive one of the subarrays of antenna elements 1406, such as a 1×8 subarray which consists of an eight element vertical linear array of printed radiators (patches). Thus, in this instance there may be 768 antenna elements over the PCB 1400. The array aperture in FIG. 14 may be approximately 4 centimeters by 12 centimeters.

Figure 15:
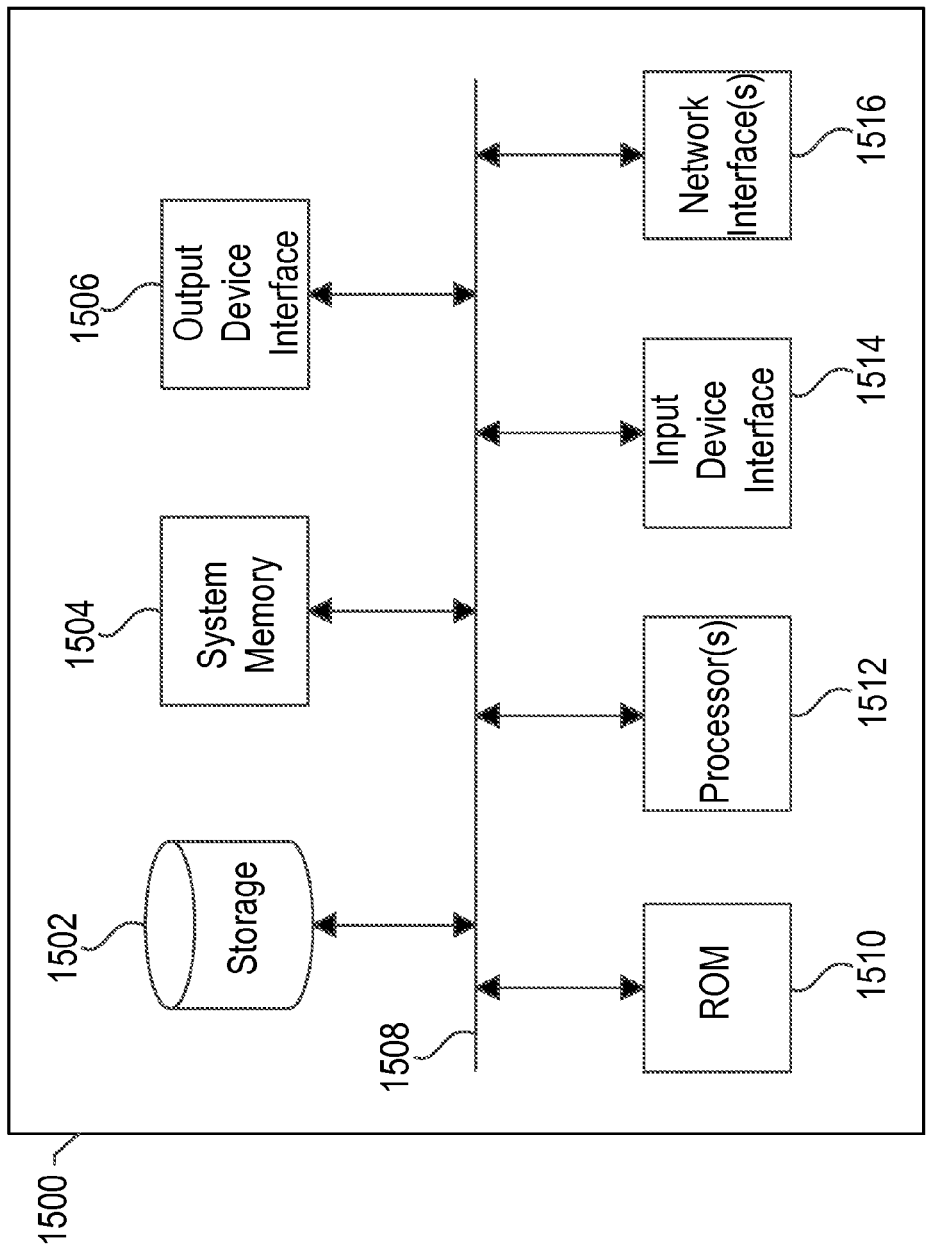
FIG. 15 conceptually illustrates an electronic system with which one or more implementations of the subject technology may be implemented.

FIG. 15 conceptually illustrates an electronic system 1500 with which one or more implementations of the subject technology may be implemented. The electronic system 1500, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 1500 can be, and/or can be a part of, one or more of the base station devices 102A-E and/or the user devices 104A-C. Such an electronic system includes various types of computer readable media and interfaces for various other types of computer readable media. The electronic system 1500 includes a bus 1508, one or more processor(s) 1512, a system memory 1504 or buffer, a read-only memory (ROM) 1510, a permanent storage device 1502, an input device interface 1514, an output device interface 1506, and one or more network interface(s) 1516, or subsets and variations thereof.

The bus 1508 collectively represents all system, peripheral, and chipset buses that communicatively connect the numerous internal devices of the electronic system 1500. In one or more implementations, the bus 1508 communicatively connects the one or more processor(s) 1512 with the ROM 1510, the system memory 1504, and the permanent storage device 1502. From these various memory units, the one or more processor(s) 1512 retrieve instructions to execute and data to process in order to execute the processes of the subject disclosure. The one or more processor(s) 1512 can be a single processor or a multi-core processor in different implementations.

The ROM 1510 stores static data and instructions that are needed by the one or more processor(s) 1512 and other modules of the electronic system 1500. The permanent storage device 1502, on the other hand, may be a read-and-write memory device. The permanent storage device 1502 may be a non-volatile memory unit that stores instructions and data even when the electronic system 1500 is off. In one or more implementations, a mass-storage device (such as a magnetic or optical disk and its corresponding disk drive) may be used as the permanent storage device 1502.

In one or more implementations, a removable storage device (such as a floppy disk, flash drive, and its corresponding disk drive) may be used as the permanent storage device 1502. Like the permanent storage device 1502, the system memory 1504 may be a read-and-write memory device. However, unlike the permanent storage device 1502, the system memory 1504 may be a volatile read-and-write memory, such as random access memory. The system memory 1504 may store any of the instructions and data that one or more processor(s) 1512 may need at runtime. In one or more implementations, the processes of the subject disclosure are stored in the system memory 1504, the permanent storage device 1502, and/or the ROM 1510. From these various memory units, the one or more processor(s) 1512 retrieve instructions to execute and data to process in order to execute the processes of one or more implementations.

The bus 1508 also connects to the input and output device interfaces 1514 and 1506. The input device interface 1514 enables a user to communicate information and select commands to the electronic system 1500. Input devices that may be used with the input device interface 1514 may include, for example, alphanumeric keyboards and pointing devices (also called "cursor control devices"). The output device interface 1506 may enable, for example, the display of images generated by the electronic system 1500. Output devices that may be used with the output device interface 1506 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 15, the bus 1508 also couples the electronic system 1500 to one or more networks (not shown) through one or more network interface(s) 1516. One or more network interface(s) may include an Ethernet interface, a WiFi interface, a cellular interface, a mmWave interface, a reduced gigabit media independent interface (RGMII), or generally any interface for connecting to a network. The one or more network interfaces 1516 may include, or may be coupled to, a physical layer module. In this manner, the electronic system 1500 can be a part of one or more networks of computers (such as a local area network ("LAN"), a wide area network ("WAN"), or an Intranet, or a network of networks, such as the Internet. Any or all components of the electronic system 1500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device comprising:
a primary radio frequency integrated circuit (RFIC) configured to:
receive an intermediate frequency (IF) signal from a baseband processor;
upconvert the IF signal to a radio frequency (RF) signal;
transmit the RF signal to a plurality of secondary RFICs;
receive a control signal from the baseband processor, the control signal comprising phase shift information items corresponding to the plurality of secondary RFICs; and
transmit each of the phase shift information items to the corresponding one of the plurality of secondary RFICs; and
each of the plurality of secondary RFICs configured to:
receive the RF signal from the primary RFIC;
phase shift and amplify the RF signal based on the phase shift information items; and
transmit the RF signal via a plurality of antenna elements.

2. The device of claim 1, wherein the primary RFIC is coupled to the baseband processor via a coaxial transmission line.

3. The device of claim 1, wherein the primary RFIC and the at least one of the plurality of secondary RFICs each comprise a same circuit.

4. The device of claim 3, wherein the same circuit comprises a plurality of switches that are configurable to switch between receiving the IF signal from the baseband processor and receiving the RF signal from the primary RFIC.

5. The device of claim 1, wherein the primary RFIC is coupled to each of the plurality of secondary RFICs via an out-of-band control channel.

6. The device of claim 5, wherein the primary RFIC is further configured to:
transmit each of the phase shift information items to the corresponding one of the plurality of secondary RFICs via the out-of-band control channel.

7. The device of claim 1, wherein the plurality of antenna elements comprise a phased array and the phase shift information items are used to configure phase shifters of each of the plurality of secondary RFICs to perform beamforming.

8. The device of claim 1, wherein at least one of the secondary RFICs is configured to receive the RF signal from the primary RFIC and transmit the signal via the plurality of antenna elements without upconverting the RF signal.

9. The device of claim 1, wherein at least one of the plurality of secondary RFICs is further configured to:
receive another RF signal via the plurality of antenna elements; and
transmit the another RF signal to the primary RFIC without downconverting the another RF signal.

10. The device of claim 9, wherein the primary RFIC is further configured to:
receive the another RF signal from the at least one of the plurality of secondary RFICs;
downconvert the another RF signal to another IF signal; and
transmit the another IF signal to the baseband processor.

11. The device of claim 1, wherein the primary RFIC is further configured to:
receive another IF signal from the baseband processor simultaneous with receiving the IF signal from the baseband processor;
upconvert the another IF signal to another RF signal; and
transmit the another RF signal to at least one of the plurality of secondary RFICs simultaneous with transmitting the RF signal to the at least one of the plurality of secondary RFICs.

12. The device of claim 11, wherein the at least one of the plurality of secondary RFICs is further configured to:
  receive the another RF signal from the primary RFIC simultaneous with receiving the RF signal from the primary RFIC;
  phase shift and amplify the another RF signal; and
  transmit the another RF signal via the plurality of antenna elements simultaneous with transmitting the RF signal via the plurality of antenna elements.

13. A method comprising:
  receiving, by a primary radio frequency integrated circuit (RFIC) and from a baseband processor, an intermediate frequency (IF) signal;
  upconverting, by the primary RFIC, the IF signal to a radio frequency (RF) signal;
  transmitting, by the primary RFIC, the RF signal to a plurality of secondary RFICs;
  receiving, by the primary RFIC and from the baseband processor, control information corresponding to each of the plurality of secondary RFICs; and
  transmitting, by the primary RFIC to each of the plurality of secondary RFICs, the control information corresponding to each of the plurality of secondary RFICs;
  receiving, by each of the plurality of secondary RFICs, the RF signal;
  phase shifting, by each of the plurality of secondary RFICs, the RF signal; and
  transmitting, by each of the plurality of secondary RFICs, the RF signal via a plurality of antenna elements.

14. The method of claim 13, further comprising:
  receiving, by the primary RFIC and from the baseband processor, control information corresponding to each of the plurality of secondary RFICs; and
  transmitting, by the primary RFIC to each of the plurality of secondary RFICs and via an out-of-band control channel, the control information corresponding to each of the plurality of secondary RFICs.

15. The method of claim 14, wherein the control information comprises phase shifting information for performing beamforming, and the method further comprising:
  configuring, by each of the plurality of secondary RFICs, one or more phase shifters of each of the plurality of secondary RFICs based at least in part on the phase shifting information.

16. The method of claim 13, wherein the primary RFIC and the plurality of secondary RFICs comprise a same circuit, wherein the same circuit is configurable to operate as the primary RFIC in a first mode of operation and to operate as one of the plurality of secondary RFICs in a second mode of operation.

17. The method of claim 13, wherein the RF signal is transmitted to the plurality of secondary RFICs at a given frequency and the RF signal is also transmitted by the plurality of secondary RFICs via the plurality of antenna elements at the given frequency.

18. The method of claim 13, wherein the primary RFIC is coupled to the baseband processor via a coaxial transmission line.

19. A circuit comprising:
  a first switch coupled to a first signal path and a second signal path, the first signal path comprising a mixer and for communicating an intermediate frequency (IF) signal, and the second signal path for communicating a radio frequency (RF) signal;
  a plurality of transmit phase shifters; and
  a plurality of communication pins,
  wherein when the first switch is in a first position, the IF signal is received over the first signal path, upconverted by the mixer to the RF signal, phase shifted by the plurality of transmit phase shifters, and transmitted via the plurality of communication pins to a plurality of secondary RF integrated circuits (RFIC), and
  when the first switch is in a second position, the RF signal is received via the second signal path, phase shifted, and transmitted via the plurality of communication pins to a device bypassing the mixer.

20. The circuit of claim 19, further comprising:
  a second switch coupled to the first signal path and the second signal path, the first signal path comprising another mixer; and
  a plurality of receive phase shifters,
  wherein when the second switch is in a third position, a second RF signal received via the communication pins is phase shifted by the plurality of receive phase shifters, downconverted by the another mixer to another IF signal and transmitted to a baseband processor, and when the second switch is in a fourth position, the second RF signal received via the communication pins is phase shifted by the plurality of receive phase shifters and transmitted to a primary RFIC bypassing the another mixer.

21. The circuit of claim 20, wherein when the first switch is in the first position, the IF signal is received from the baseband processor and when the first switch is in the second position the RF signal is received from the primary RFIC.

22. The circuit of claim 19, wherein when the first switch is in the second position, each of the plurality of communication pins is coupled one of a plurality of antenna elements and the RF signal is transmitted to the device via each of the plurality of antenna elements.

* * * * *